US007536284B2

(12) United States Patent
Linzey et al.

(10) Patent No.: US 7,536,284 B2
(45) Date of Patent: May 19, 2009

(54) ELECTRICAL WIRE INTERCONNECT SYSTEM RISK ASSESSMENT TOOL

(75) Inventors: William Linzey, Reston, VA (US); Eric Wiesenfeld, Arlington, VA (US); Michael Traskos, Herndon, VA (US); Thomas Mazzuchi, Fairfax, VA (US)

(73) Assignee: Lectromechanical Design Company, Dulles, VA (US)

( * ) Notice: Subject to any disclaimer, the term of this patent is extended or adjusted under 35 U.S.C. 154(b) by 551 days.

(21) Appl. No.: 11/213,854

(22) Filed: Aug. 30, 2005

(65) Prior Publication Data

US 2007/0050178 A1 Mar. 1, 2007

(51) Int. Cl.
G06F 17/50 (2006.01)
H02H 3/00 (2006.01)

(52) U.S. Cl. .............................. 703/2; 703/22; 361/42; 361/62

(58) Field of Classification Search .................. 703/18, 703/24, 2, 22; 361/42, 63, 93.1, 62
See application file for complete search history.

(56) References Cited

U.S. PATENT DOCUMENTS

| 4,632,802 | A |   | 12/1986 | Herbst et al. |
|-----------|---|---|---------|---------------|
| 5,930,762 | A |   | 7/1999  | Masch         |
| 6,161,077 | A | * | 12/2000 | Fawcett ................. 702/58 |
| 6,223,143 | B1|   | 4/2001  | Weinstock et al. |
| 6,321,187 | B1|   | 11/2001 | Squier et al. |
| 6,677,761 | B1| * | 1/2004  | Greulich ..................... 324/533 |
| 6,742,000 | B1|   | 5/2004  | Fantasia et al. |
| 6,820,044 | B2|   | 11/2004 | Groen et al. |
| 2003/0149548 | A1 |   | 8/2003 | Mosses et al. |
| 2004/0193938 | A1 |   | 9/2004 | Shah et al. |
| 2004/0193958 | A1 |   | 9/2004 | Shah et al. |
| 2004/0205397 | A1 |   | 10/2004 | Rajiv et al. |
| 2004/0205398 | A1 |   | 10/2004 | Osborn et al. |
| 2005/0057869 | A1 | * | 3/2005 | Hale et al. ..................... 361/64 |

OTHER PUBLICATIONS

Lectromechanical Design Company, "FAA Aircraft Electrical Interconnect Systems Risk Assessment," Task 1 Report, Identify Current EWIS Design and Risk Assessment Methods, Techniques, Practices and Tools, Dec. 17, 2002.
Linzey, William G., et al., "A Risk Analysis of Wire Failure Potential in the Aircraft Industry," The 8th Joint NASA/FAA/DOD Conference on Aging Aircraft, Feb. 1, 2005.
Linzey, Bill, "EWIS Risk Assessment Tool," presented to ATSRAC HWG#12, Dec. 3, 2003.
Linzey, William, "Enhanced Risk Assessment Tools for Electrical Wiring Interconnection Systems (EWIS)—Project Overview," Aug. 30, 2004.

(Continued)

*Primary Examiner*—Thai Phan
(74) *Attorney, Agent, or Firm*—Oblon, Spivak, McClelland, Maier & Neustadt, P.C.

(57) ABSTRACT

A system, method, and computer program product for assessing risk to an aircraft electrical wire interconnect system (EWIS). Information describing an aircraft EWIS, historical failure information, and expert opinion information is populated in a database. The EWIS risk assessment tool performs an EWIS risk assessment based on analytic techniques performed using information stored in the database.

30 Claims, 34 Drawing Sheets

OTHER PUBLICATIONS

Lectromechanical Design Co., "Enhanced Risk Assessment Tools for Electrical Wiring Interconnection Systems (EWIS)—Project Overview (preliminary)," 6th Annual Joint FAA/DOD/NASA Conference on Aging Aircraft, Sep. 17, 2002.

Federal Aviation Administration, Federal Aviation Regulations (FAR), Section 25.1309—Equipment, systems, and installations.

Variakojis, Vidmantas and Slotte, Stephen, on behalf of the members of ATSRAC WSHWG and ARAC ESHWG, "ATSRAC Task 6: Wire Systems Certification Requirements Harmonization Working Group, Final Report to ATSRAC," Oct. 29, 2002.

U.S. Department of Transportation, Federal Aviation Administration, "Draft EZAP NPRM," Jul. 15, 2002.

U.S. Department of Transportation, Federal Aviation Administration, Advisory Circular, No. 120-XX, "Program to Enhance Aircraft Electrical Wiring Interconnection System Maintenance," Jul. 15, 2002.

Boren, Randy M., Norhtwest Airlines, Aging Transport Systems Rulemaking Advisory Committee, "Task 9, Final Report—Revision 1," Jul. 15, 2002.

U.S. Department of Transportation, Federal Aviation Administration, Advisory Circular, No. 25. 1309-1A, "System Design and Analysis," Jun. 21, 1988.

SAE International, Aerospace Recommened Practice (SAE ARP 4761). "Guidelines and Methods for Conducting the Safety Assessment Process on Civil Airborne Systems and Equipment," issued Dec. 1996.

Linzey, Dr. William G., et al., "A Risk Analysis of a Wire Failure Potential in the Aircraft Industry".

Press, V.L., et al., "Advanced Risk Assessment Methods for Aircraft Electrical Wiring Interconnection Systems (EWIS)," 6th Joint FAA/DoD/NASA Conference on Aging Aircraft, Sep. 16, 2002.

Slenski, George A., et al., "Aircraft Wiring System Integrity Initiatives—A Government and Industry Partnership," U.S. Air Force Research Laboratory, Materials and Manufacturing Directorate.

Wood, D.C., et al., "Risk Assessment for Aircraft Electrical Interconnect Subsystems (EIS)".

* cited by examiner

ELECTRICAL WIRE INTERCONNECT SYSTEM RISK ASSESSMENT TOOL

GOVERNMENT LICENSE RIGHTS

The U.S. Government has a paid-up license in this invention and the right in limited circumstances to require the patent owner to license others on reasonable terms as provided for by the terms of DTFA0302C0012 awarded by the Federal Aviation Administration, William J. Hughes Technology Center.

BACKGROUND

Airport and airline safety are at the forefront of current national and international concern. There are obvious concerns about the safety of airplanes and the potential for an electronic failure during a flight. This has been amplified of late due to the threat of terrorism and tampering with airplanes to produce failures. Other aircraft failures that are not terror related continue to demonstrate an ongoing need to continue the advance of airplane safety.

One such occurrence, the crash of Trans World Airlines (TWA) 800 on Jul. 17, 1996, prompted the creation of the White House Commission on Aviation Safety and Security (the Commission) to make recommendations concerning government regulation of the airline industry as it relates to safe air travel in the United States. The Commission recommended a need to decrease the rate of accidents by a factor of five within a decade. They proposed to accomplish this by revising the Federal Aviation Administration's (FAA) regulatory certification program. The Commission led to the establishment of the Aging Transport Systems Rulemaking Advisory Committee (ATSRAC), which performed some of the first studies regarding aging aircraft and their electrical wire interconnect systems (EWIS) in order to determine the airworthiness of commercial airplanes.

The delivery of electrons throughout the aircraft is such an essential function that wiring can not be regarded as a "fit and forget" item. Detailed inspections of in-service wiring on present commercial airplanes show that EWIS problems are common to both large and small transport aircraft. Moreover, today's jet aircraft rely on more and more sophisticated electrical and computer systems, placing a premium on the reliability of wiring, power feeder cables, connectors and circuit protection devices. Wiring is now recognized as a vital aircraft-level function and is regarded as its own important system on board an airplane.

The physical failure of wiring can cause significant damage to the aircraft EWIS, but can also cause significant collateral damage to other aircraft systems, and potentially lead to an aircraft-level failure. Wires have several modes of failure, each capable of compounding into other problems. Wires can open and they can short to other wires or to ground. These modes of failure are often treated in reliability and risk analyses of electrical systems.

Another failure mode, electrical arc track, is a phenomenon that can cause significant collateral damage to aircraft systems and are not adequately treated in airplane risk assessments. An electric arc is an electrical breakdown of a gas which produces an ongoing plasma discharge, resulting from a current flowing through normally nonconductive media such as air. The arc occurs in the gas-filled space between two conductive electrodes (such as the frayed ends of two damaged pieces of wire) and it results in a very high temperature, capable of melting or even vaporizing nearby objects. This phenomenon should be understood in order to adequately assess the potential for collateral damage in such a wire failure event; however this type of wire failure has not been included in traditional risk assessment methods.

It is known that wiring malfunctions have contributed to turn-backs and in-flight diversions, some involving declared emergencies and, in rare but tragic instances, wiring malfunctions have progressed to loss of the aircraft. Furthermore, the amount of wiring in transport category aircraft continues to increase over time, with no plateau yet visible. As the amount of wiring on an airplane increases, so does the potential exposure to wiring failures. Today, most large transport category aircraft contain roughly 200-300 miles of wiring. The amount of wiring on modern aircraft has made the weight of the wiring a non-trivial issue. To compensate for the additional miles of wire aboard an aircraft, manufacturers have been forced to use progressively thinner insulation. Some research indicates that the average amount of insulation provided for each wire has decreased by a factor of seven since the 1950s. As the amount of wire on an airplane increases and the insulation becomes progressively thinner, the potential for failure also increases.

As modern aircraft increase in size and complexity, the addition of advanced navigation, communication, control, and entertainment systems results in an extremely complex network of electrical connections. Because space is at a premium aboard today's aircraft, wires are often bundled together in groups ranging from several wires to several hundred wires. This can force the collocation of wires from several vital aircraft systems, creating a situation where a failure in one set of wires could cause cascading damage that affects several vital aircraft systems and could potentially compromise the overall airworthiness of the airplane. The increase in the size and complexity of an aircraft's EWIS, coupled with weight concerns that necessitate progressively thinner and lighter insulation materials, result in a distinct increase in the potential for EWIS failure. These issues and their consequences necessitate the formal treatment of the risk of the EWIS and its connectivity to the aircraft as a whole.

In order to counteract these growing problems, several sets of goal-oriented laws have passed that attempt to direct manufacturers and operators to achieve the goals in the way they feel is best. Because these goal-oriented laws do not set forth guidelines for achieving the safety goals, the manufacturers and operators must innovate in the way they perform safety analyses.

One such law set by Federal Aviation Regulation, FAR 25.1309: *Equipment, Systems and Installations*, sets the following two goals:

(1) The occurrence of any failure condition which would prevent the continued safe flight and landing of the airplane is extremely improbable, and (2) The occurrence of any other failure condition which would reduce the capability of the airplane or the ability of the crew to cope with adverse operating conditions is improbable.

FAR25.1309 goes on to state that compliance with these goals must be shown by some form of analysis or test. However, the general language of this regulation has led to confusion as to what is a valid method of showing compliance. Additionally, the complexity of aircraft EWIS, including complicated networks of statistical dependence, non-obvious collocations of vital aircraft systems, and failures in wire insulation that are undetectable by visual inspection make verification of these goals difficult. Assigning a probability of failure to a system that is this complicated is an extremely difficult task that requires significant time, energy, and financial investment.

Due to the complexity and difficulty in demonstrating compliance with FAR 25.1309, the FAA issued a variety of documents intending to demonstrate ways to show compliance with the regulation. Several of these documents, however, proved to be too general and thus provided the manufacturers and operators with little more than initial guidance.

As a result of the continued difficulty in determining ways to comply with FAR 25.1309, the Society of Aircraft Engineers (SAE) published several documents in 1996 directed to providing a uniform method of compliance with the regulation. These documents, such as Aerospace Recommended Practice (ARP) 4754 and ARP 4761, attempt to clarify and outline a number of systematic approaches to showing compliance with FAR 25.1309. These documents, however, still do not provide sufficient guidance for airplane manufactures, operators, and certification authorities to establish a standard method of compliance with FAR 25.1309.

By January 2002, approximately five years after the issuance of ARP4761, the FAA's Airport and Aircraft Safety Research and Development Division (AAR-400) determined that accidents and incidents that have occurred in the past indicate that the assessment tools used in the development and assessment of Electrical Wire Interconnect Systems remained insufficient. In February of 2002, the FAA determined that in modern civil aircraft, EWIS failures are "latent with no official certification check requirement available." In addition, the FAA concluded that the more complex systems of current generation aircraft design necessitate more sophisticated analysis techniques.

Although the latest version of FAR1309 issued in September of 1977, the complexity of airplane electrical wire interconnect systems has increased steadily in the past 30 years. Therefore, compliance with FAR1309 has become increasingly more difficult to demonstrate. Analysis techniques and limits in computational power have not improved or increased as quickly as the technology found on modern airplanes. Evidenced by the evolution of regulatory structure and procedures, the speed at which airplanes evolve and increase in complexity has left aircraft manufacturers and operators ill-equipped to evaluate the reliability of their systems in any sort of quantitatively rigorous fashion. Previous efforts to show compliance with federal regulations have fallen short of identifying all potential failure modes and fail to address the cascading failure of multiple independent functions within wire bundles and consequential damage and failure of sub-systems located adjacent to or in the vicinity of EWIS failures. The problem of meeting the federal guidelines remains.

Risk assessment in the aircraft industry as performed on a modern airplane consists of both qualitative and quantitative components. Risk assessments are not designed to assign a single level of risk to an entire aircraft. Rather, different aspects of a risk assessment are used to calculate failure probabilities, event probabilities, aircraft functional reliability, collateral damage calculations, and many other components of risk. Each of these aspects may be used in assessing both quantitative and qualitative risk levels that are deemed acceptable by the aircraft industry and government agencies.

SUMMARY

The inventors of the present invention have recognized that currently no methods, systems, or computer program products are available to sufficiently analyze risk associated with an aircraft EWIS. Accordingly, one object of the present invention is to provide a solution to this problem, by generating risk assessment information that will help analysts calculate and perform both the quantitative and qualitative aspects of a risk assessment that are required, as well as other problems and deficiencies with conventional techniques for assessing EWIS risk.

To address these deficiencies, the present inventors have invented a novel computer-based system, method, and computer program product through which a risk in an aircraft EWIS may be assessed. In one exemplary embodiment, a system for assessing risk of failure in an aircraft wiring system is disclosed. The risk assessment system accepts as input the name or location of a type of failure to be evaluated. The system then queries a first database having stored therein electrical wire interconnect system model information, and a second database having stored therein electrical wire interconnect system failure and failure rate information. The risk assessment tool queries one or both databases and calculates wire failure probabilities based on, for example, the severity of the environmental conditions to which the wire is subject. In one embodiment of the present invention, the risk assessment tool uses a paired comparison technique making use of expert opinion to obtain failure probabilities for wires based on, for example, their operating environment. As would be understood by those of ordinary skill in the art, techniques other than a paired comparison technique could be used to fill in incomplete and/or unreliable historical data while remaining within the scope of the invention. The tool then propagates the calculated failure probabilities through higher-level fault structures to obtain the probabilities for higher-level aircraft failures.

In one embodiment of the invention, every bundle of aircraft wire on an airplane can be described to the risk assessment system in terms of its constituent wires and the systems and sub-systems of which those wires are a part. This descriptive data is stored in databases accessed by the tool to make comparisons used to generate fault data and probabilities of faults. The tool also allows for such information to be cross-checked with design safety principles to generate a report listing any principles that may have been violated.

In another embodiment of the invention, a computer program product is used as a diagnostic tool. In the event that any systems are malfunctioning, the tool is used to identify locations on the airplane where those systems are located. The diagnostic tool includes a processor programmed to populate databases storing historical aircraft failure data, general aircraft data, and aircraft data for the type of aircraft to be diagnosed. The diagnostic tool then makes use of software to compare the data in the databases to identify faults and potential common causes for multiple system failures.

BRIEF DESCRIPTION OF THE FIGURES

Advantages of exemplary embodiments of the present invention will be apparent from the following detailed description of the exemplary embodiments thereof, which description should be considered in conjunction with the accompanying drawings in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One embodiment of the present invention is a tool used in establishing a methodology for evaluating EWIS on modern aircraft. This EWIS Risk Assessment Tool (EWIS RAT) facilitates a more complete compliance with FAR 1309 than is achievable using conventional methodologies.

Figure 1:
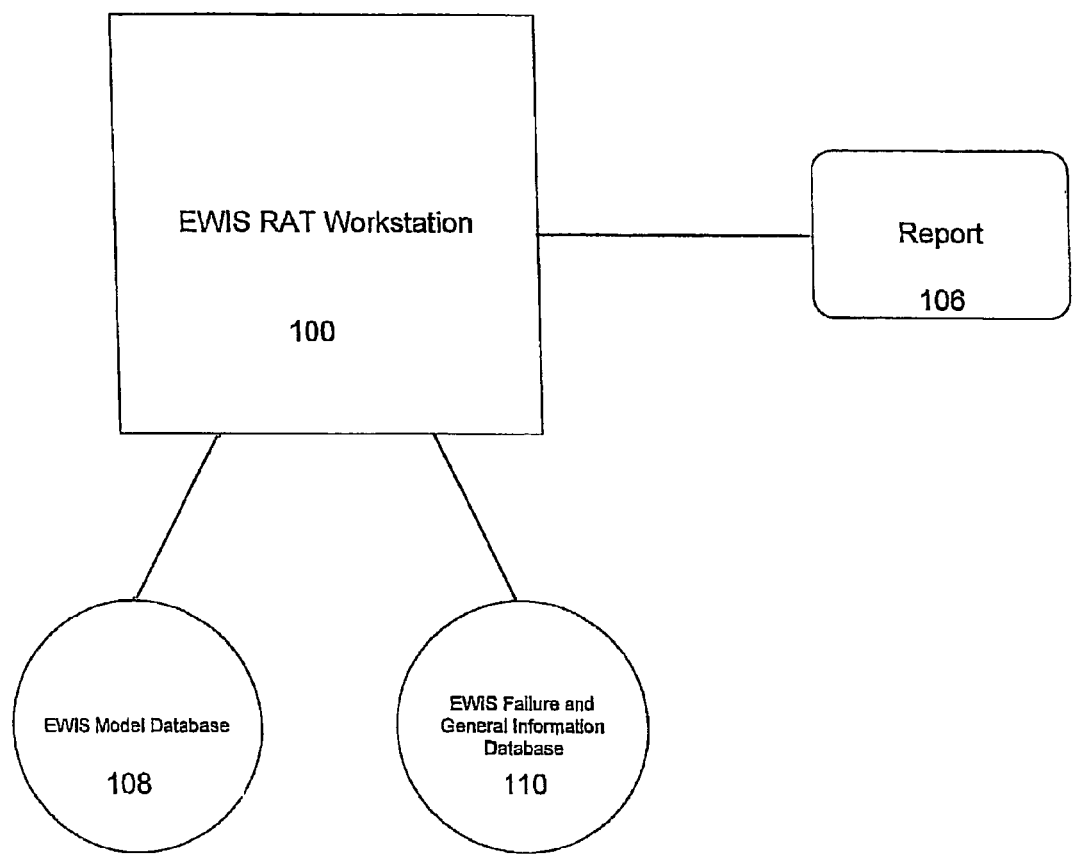
FIG. 1 shows an exemplary diagram of the electrical wire interconnect system risk assessment tool (EWIS RAT).

FIG. 1 shows an exemplary block diagram of the EWIS RAT system. EWIS RAT workstation 100 may be any type of workstation or user console that allows a user to both input and view data, execute programs and process data, such as those described in White, R., "How Computers Work," Que Corporation, September 1999, Millennium Edition, pp. 10-15, the entire contents of which are incorporated herein by reference. Workstation 100 retrieves EWIS model data from database 108 and EWIS failure and general information from database 110. EWIS model database 108 and EWIS failure and general information database 110 are digital repositories that may be implemented, for example, using a commercially available database such as ACCESS available from Microsoft Corporation, ORACLE, SYBASE, or other commercially available or custom developed database. in one embodiment of the present invention, workstation 100 executes software programmed to perform a paired comparison based on data provided by a user and data maintained in the EWIS model database 108 and the EWIS failure and general information database 110 to produce various reports 106. As would be understood by those of ordinary skill in the art, techniques other than a paired comparison technique could be used to fill in incomplete and/or unreliable historical data while remaining within the scope of the invention. Reports 106 may be provided in a variety of formats and may include EWIS failure probability data.

Figure 2:
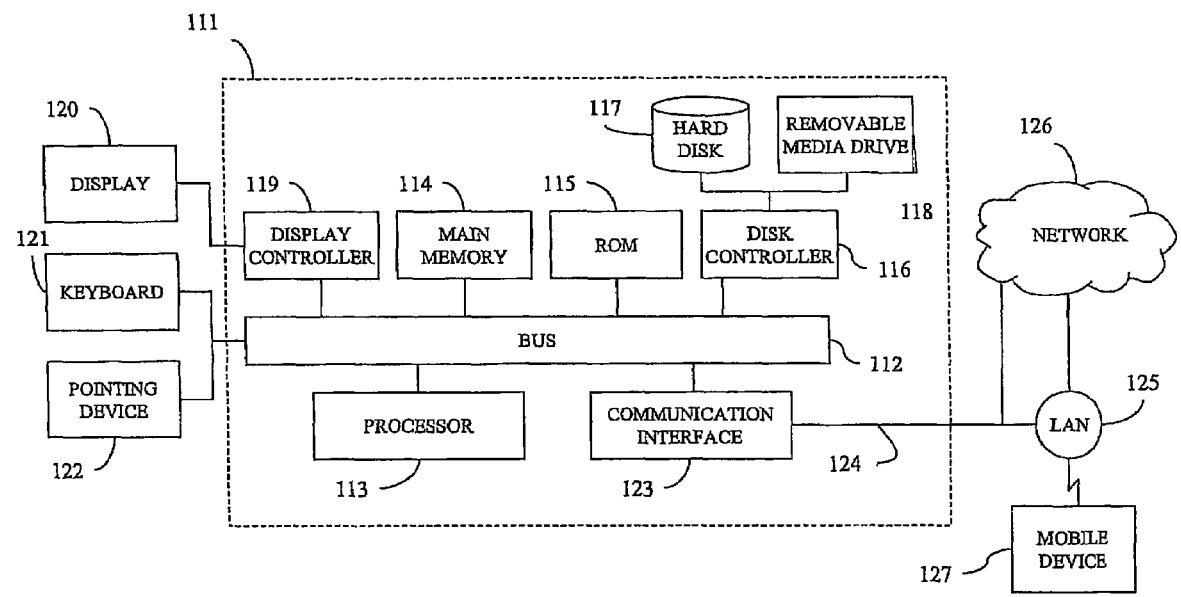
FIG. 2 shows an exemplary diagram of a computer system.

FIG. 2 illustrates an exemplary computer system 111 upon which an embodiment of the present invention may be implemented. For example, the EWIS RAT workstation 100 may be implemented on a computer system such as computer system 111. The computer system 111 includes a bus 112 or other communication mechanism for communicating information, and a processor 113 coupled with the bus 112 for processing the information. The computer system 111 also includes a main memory 114, such as a random access memory (RAM) or other dynamic storage device (e.g., dynamic RAM (DRAM), static RAM (SRAM), and synchronous DRAM (SDRAM)), coupled to the bus 112 for storing information and instructions to be executed by processor 113. In addition, the main memory 114 may be used for storing temporary variables or other intermediate information during the execution of instructions by the processor 113. The computer system 111 further includes a read only memory (ROM) 115 or other static storage device (e.g., programmable ROM (PROM), erasable PROM (EPROM), and electrically erasable PROM (EEPROM)) coupled to the bus 112 for storing static information and instructions for the processor 113.

The computer system 111 also includes a disk controller 116 coupled to the bus 112 to control one or more storage devices for storing information and instructions, such as a magnetic hard disk 117, and a removable media drive 118 (e.g., floppy disk drive, read-only compact disc drive, read/write compact disc drive, compact disc jukebox, tape drive, and removable magneto-optical drive). The storage devices may be added to the computer system 111 using an appropriate device interface (e.g., small computer system interface (SCSI), integrated device electronics (IDE), enhanced-IDE (E-IDE), direct memory access (DMA), or ultra-DMA).

The computer system 111 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 111 may also include a display controller 119 coupled to the bus 112 to control a display 120, such as a cathode ray tube (CRT), for displaying information to a computer user. The computer system includes input devices, such as a keyboard 121 and a pointing device 122, for interacting with a computer user and providing information to the processor 113. The pointing device 122, for example, may be a mouse, a trackball, or a pointing stick for communicating direction information and command selections to the processor 113 and for controlling cursor movement on the display 120. In addition, a printer may provide printed listings of data stored and/or generated by the computer system 111.

The computer system 111 performs a portion or all of the processing steps of the invention in response to the processor 113 executing one or more sequences of one or more instructions contained in a memory, such as the main memory 114. Such instructions may be read into the main memory 114 from another computer readable medium, such as a hard disk 117 or a removable media drive 118. One or more processors in a multi-processing arrangement may also be employed to execute the sequences of instructions contained in main memory 114. In alternative embodiments, hard-wired circuitry may be used in place of or in combination with software instructions. Thus, embodiments are not limited to any specific combination of hardware circuitry and software.

As stated above, the computer system 111 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 111, for driving a device or devices for implementing the invention, and for enabling the computer system 111 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 113 for execution. A computer readable medium may take many forms, including but not limited to, non-volatile media, volatile media, and transmission media. Non-volatile media includes, for example, optical, magnetic disks, and magneto-optical disks, such as the hard disk 117 or the removable media drive 118. Volatile media includes dynamic memory, such as the main memory 114. Transmission media includes coaxial cables, copper wire and fiber optics, including the wires that make up the bus 112. Transmission media also may also take the form of acoustic or light waves, such as those generated during radio wave and infrared data communications.

Various forms of computer readable media may be involved in carrying out one or more sequences of one or more instructions to processor 113 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 111 may receive the data on the telephone line and use an infrared transmitter to convert the data to an infrared signal. An infrared detector coupled to the bus 112 can receive the data carried in the infrared signal and place the data on the bus 112. The bus 112 carries the data to the main memory 114, from which the processor 113 retrieves and executes the instructions. The instructions received by the main memory 114 may optionally be stored on storage device 117 or 118 either before or after execution by processor 113.

The computer system 111 also includes a communication interface 123 coupled to the bus 112. The communication interface 123 provides a two-way data communication coupling to a network link 124 that is connected to, for example, a local area network (LAN) 125, or to another communications network 126 such as the Internet. For example, the communication interface 123 may be a network interface card to attach to any packet switched LAN. As another example, the communication interface 123 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 123 sends and receives electrical, electromagnetic or optical signals that carry digital data streams representing various types of information.

Figure 3:
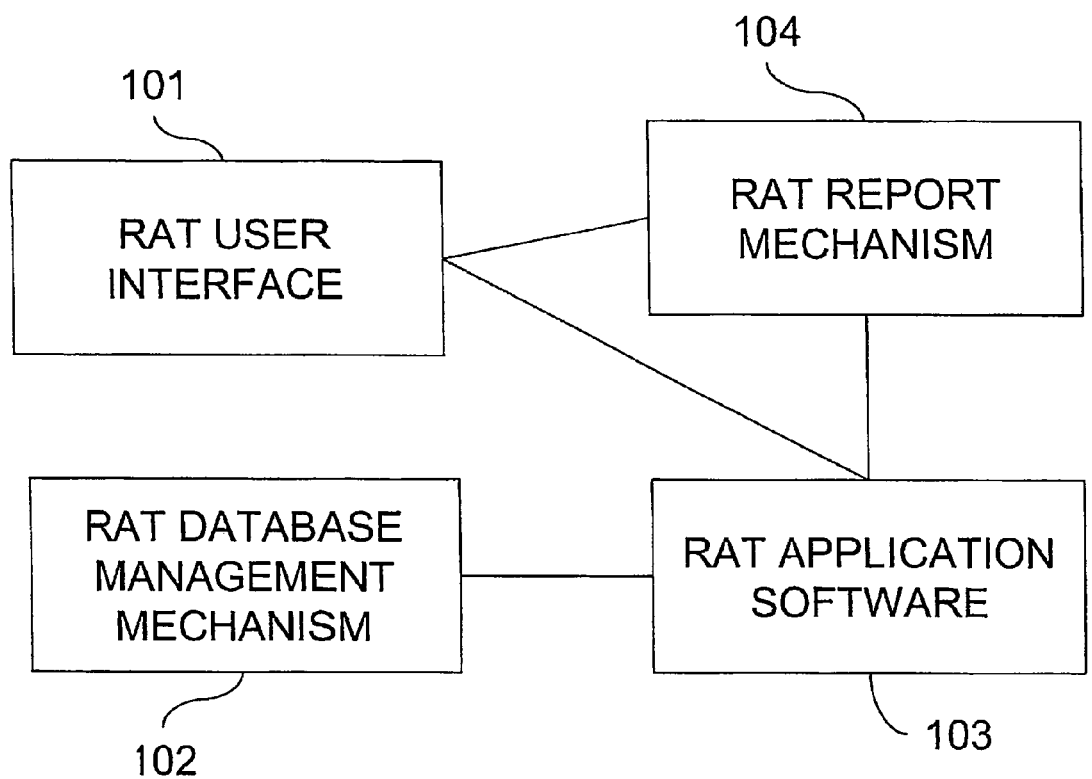
FIG. 3 shows a block diagram illustrating mechanisms of the EWIS RAT workstation of FIG. 1.

FIG. 3 shows the mechanisms implemented by the EWIS RAT workstation 100 in greater detail. The EWIS RAT workstation 100 includes a RAT user interface 101, a RAT database management mechanism 102, RAT application software 103, and a RAT report mechanism 104. The RAT user interface 101 allows users to interact with the EWIS RAT. The RAT user interface 101 presents information to, and obtains information from the user of the system in order to maintain the information in the EWIS model database 108 and the EWIS failure and general information database 110, and to request reports from the system. The RAT user interface 101 interacts with the RAT database management mechanism 102 in order to maintain the information in the EWIS model database 108 and the EWIS failure and general information database 110. The RAT user interface 101 interacts with the RAT report mechanism 104 to allow a user to select a desired report from the EWIS RAT. The RAT report mechanism 104 interacts with the RAT application software 103 in order to generate the desired report. In generating the desired report, the RAT application software 103 interacts with the RAT database management mechanism 102 in accessing information in the EWIS model database 108 and the EWIS failure and general information database 110 to generate the desired report.

The RAT user interface 101 is developed to support the workflow of the users of the system. For example, the RAT user interface 101 includes data entry screens to allow a user to populate data into the EWIS model database 108 and the EWIS failure and general information database 110. Similarly, the RAT user interface presents options to a user that allows the user to direct the RAT application software 103 to undertake the desired analysis and to generate the reports of interest to the user. The RAT user interface 101 also allows a user to annotate a bundle section report to clarify safety principles and system functionality identified in the reports.

Figure 4:
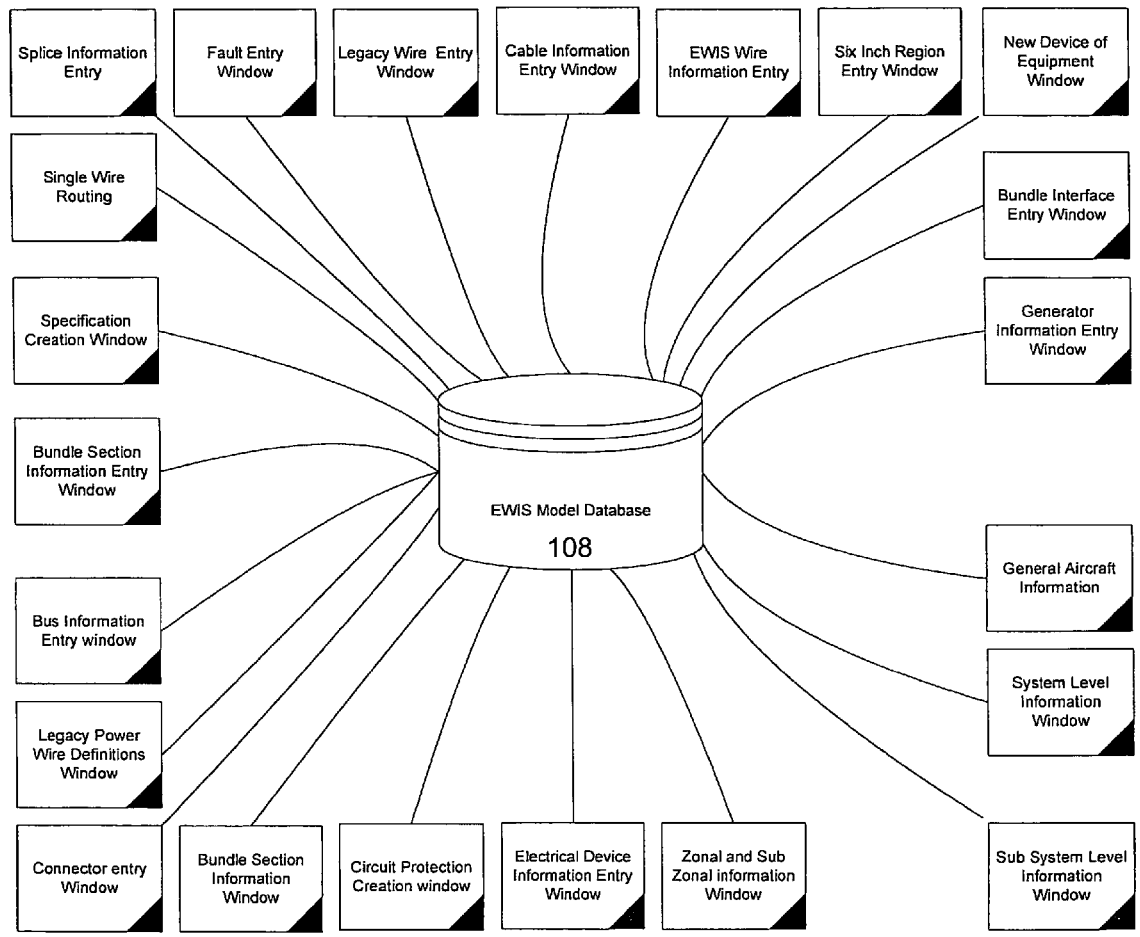
FIG. 4 shows an exemplary diagram of EWIS model database population entry screens.

FIG. 4 illustrates an exemplary implementation of a RAT user interface 101, showing the data entry screens through which a user may maintain information in the EWIS model database 108 according to one embodiment of the invention. The EWIS model database 108 contains specific information about an aircraft. EWIS model database 108 may be populated by data entry windows designed to obtain pertinent information from a user such as the electrical components, operational characteristics of the electrical systems, connections to higher level aircraft systems and sub-systems, fault instructions and the location of every wire and connector on the aircraft. Examples of data entry screens or graphical user interface windows that may be used to obtain information used to populate EWIS model database 108 are shown in FIG. 4. As described above, the software that makes up this portion of the RAT user interface 101 interacts with the RAT database management mechanism 102 which maintains the EWIS model database 108 and the EWIS failure and general information database 110. As an example, these data entry screens may provide the capability for a user to enter general aircraft information, system level information, sub-system level information, zonal and sub-zonal information, electrical device information, information related to the creation of circuit protection, bundle section information, connectors, legacy power wire definitions, bus information, bundle section information, information relate to the creation of a specification, single wire routing, splice information, fault information, legacy wire information, cable information, EWIS wire information, six inch region information, new device or equipment information, bundle interface information, and/or general information. Other data entry capabilities may be provided through the RAT user interface 101 as necessary for entry of other data related to aircraft information, program information or any other data that may need to be entered.

As a further description of one exemplary embodiment of a RAT user interface 101, a graphical user interface (GUI) window for entering general aircraft information may be opened by a user. A window for general aircraft information may include fields for entering data such as the aircraft model name, make, model and series, the phase of flight (e.g. take-off, landing, etc.), and a default Tau. A window may also include a data field that allows a user to enter in other data. For example, data fields allowing entry of data related to operating conditions, could be provided, which would allow a user to provide an accurate description of the conditions under which a particular aircraft is operating. A window may also include any number of buttons for accessing different menus or series of menus, such as buttons for accessing windows providing the ability to enter data related to system branch, zonal branch and bundle branch information, or for accessing any other data maintained in the EWIS model database 108 or the EWIS failure and general information database 110. As a further example, a system button could be provided to give access to windows for maintaining system level, sub-system level and EWIS information (creating wires and connectors associated with systems) entry windows.

Figure 5:
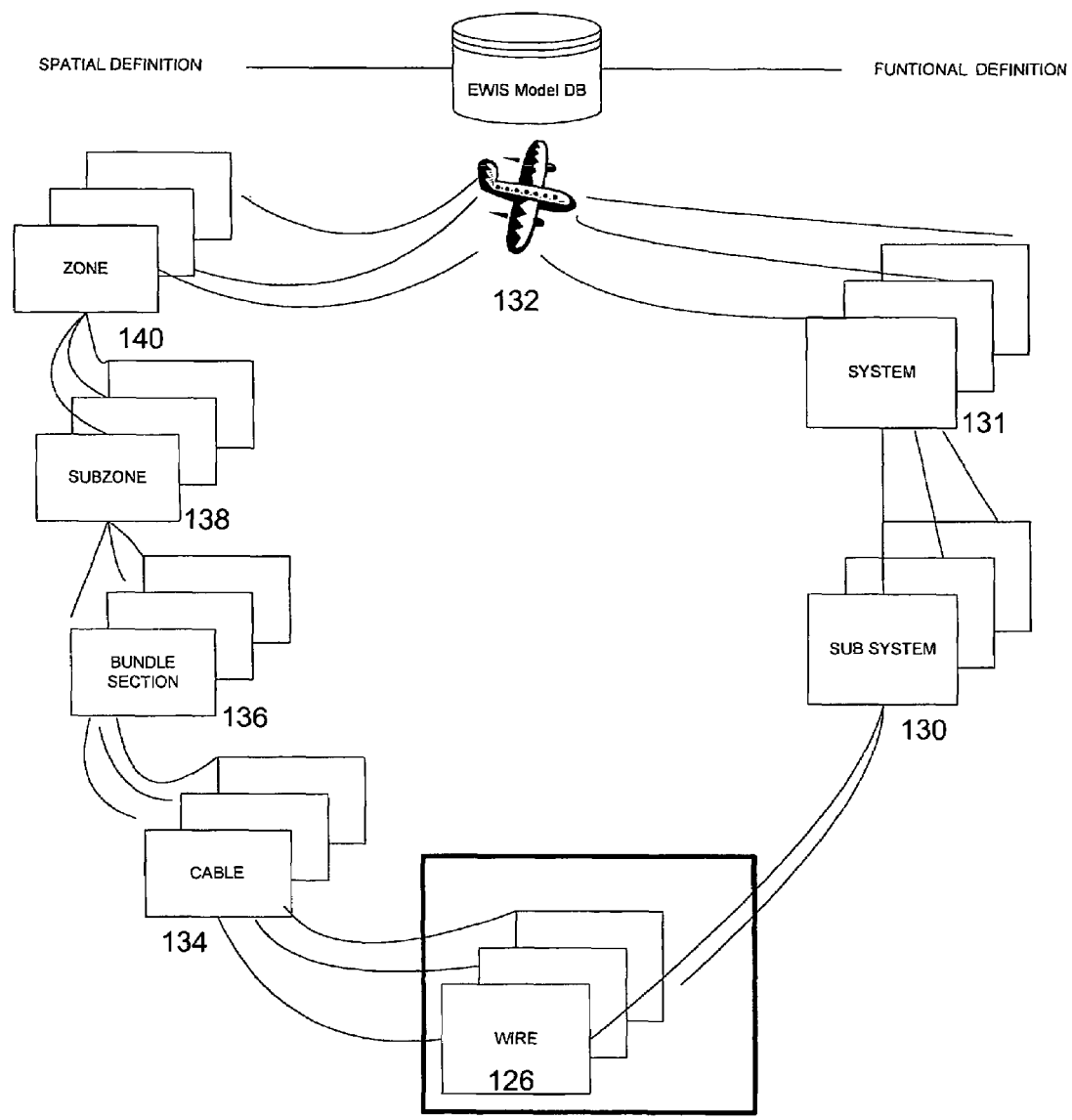
FIG. 5 shows an exemplary diagram of a EWIS model database structure.

The EWIS model database 108 stores the EWIS model information for a particular aircraft. EWIS model database 108 stores both functional and spatial descriptions of the EWIS. The spatial description includes several different levels, as illustrated on the left hand side of FIG. 5. As illustrated in FIG. 5, the spatial description starts with wire level information 126. Wires can be grouped at the cable level 134. Cables can be grouped at the bundle section level 136. Bundle sections can be grouped at the subzone level 138. Subzones can be grouped at the zone level 140. Finally, the zones can be grouped at the aircraft level 132. This hierarchical description of the EWIS is but one exemplary model. Other aggregations could be modeled in accordance with the present invention.

The functional description of the EWIS in EWIS model database 108 also occurs on several different levels, as illustrated on the right hand side of FIG. 5. As illustrated in FIG. 5, the functional description also starts at the wire level 126. The wires are included at the subsystem level 130. The subsystems are grouped at the system level 131. Finally, the systems are grouped at the aircraft level 132.

The EWIS component level refers to what electrical component, such as a wire or a cable, is being referenced. The bundle section level refers to groupings of components at a particular location. This could be, for example, a group of wires and cables that are bound together and lead to a common location. The zonal level refers to a particular section of an aircraft where a bundle is located. Included with these items that describe the EWIS structure, is information that describes the fault structure of the design, i.e. how faults are propagated through the system and how they manifest at higher levels in the system.

At the component level, once a wire is fully defined in terms of its function and composition, it is placed in the appropriate bundle sections of EWIS model database 108. The properties of that wire are now related to those bundle sections. When more wires are added to bundle sections and the bundle routing data is added, the bundle sections become fully defined. Fully defined bundle sections are then placed into zones. The component and bundle data from that bundle section are then related to a specific zone. Once in operation, the environment and equipment data are added to the bundle section data, thus more fully defining the zone.

In other embodiments of the invention, each of the EWIS model levels may be sub-divided into different data groups. For example, the EWIS component level may be split into different data groups, such as the wire/connector group, the multi-wire cable group, and the circuit protection group. Each of these data groups may be defined by a group of data elements that are maintained in the EWIS model database 108. For example, a multi-wire cable data group may include data elements such as cable ID, constituent wire, and shielding/jacket. A wire/connector data group may include data elements such as a wire ID, system, sub-system, wire connection data, wire physical characteristics, power characteristics, special wire information, circuit protection, and failure effect for different failure modes. A circuit protection group may include data elements such as a circuit protection ID, type, rating, and an identification of which electric bus it is connected to.

The bundle section level may be subdivided into data groups including, for example, a bundle section and a "within 6 inches" region. A bundle sections may include data elements such as bundle section ID, constituent wire/cable, length, curvature, bundle section interface, and bundle type. A "within six inches region" may include data elements such as adjacent bundle sections, adjacent electrical and non-electrical devices, and other adjacent installations, for example hydraulic lines.

The zonal level may be subdivided into data groups including, for example, sub-zone and zone. A zone data group may include data elements such as zone ID and description. A sub-zone data group may include data elements such as sub-zone ID, contained bundle sections, contained electrical and non-electrical devices and installations, environmental conditions, and special zonal designations, for example fire zones.

Additionally, there can be one or more miscellaneous or non-level specific EWIS model levels. These levels may be sub-divided, for example, into data groups of system/sub-system, connector and splice, electrical and non-electrical equipment, failure effect, generator/power source and electric bus, and general aircraft information. A system/subsystem data group may include data elements such as system ID, subsystem ID, redundancy and description. A connector and splice data group may include data elements such as connector ID, connector type, mil spec, mating frequency, zone splice ID, and splice type. An electrical and non-electrical equipment data group may include data elements such as equipment ID, system, subsystem, and MEL. A failure effect data group may include data elements such as effect ID, scope, system, sub-system, connection to system fault tree, likely detection, and detection description. A generator/power source and electric bus data group may include data elements such as source ID, bus ID, source generator, frequency (or DC), phase, and magnitude. A general aircraft information data group may include data elements such as model name, phase of flight, default Tau (exposure time) and aircraft make, model and series.

In other embodiments of the invention, an aircraft and all of its associated systems may be defined by any of a variety of different groupings or levels. The functional and spatial definitions of the aircraft described herein are used only as exemplary definitions of an aircraft and therefore many other definitions are within the scope of the invention.

In defining a wire as part of a EWIS model, it is desirable to characterize the failure effects for the different failure models that may occur to the system. In one embodiment of the invention, three exemplary levels of effect can be entered for a wire. These include (1) EWIS or functional fault, (2) local fault or (3) basic event and higher level effect. The EWIS or functional fault is the lowest fault level that can be entered. The local fault or basic event is the level that will commonly be linked to fault trees. The higher level effect can be used for grouping related faults that occur.

Additionally, to provide a full and consistent model for defining the structure or architecture of the EWIS system, both termination points of a wire may be identified. When both termination points are identified, wires that are connected in series through a connector may be identified. This can allow the tool to alert the user if there are any inconsistencies in the model, such as if a power wire is mistakenly connected to a ground wire. Additionally, wire properties, such as voltage characteristics and effect of failure, may be inherited from previously entered wire data.

In a further embodiment of the invention, the user can create multi-wire cables having shield and jacket properties. The user may assign the appropriate wire to the cable and wires not assigned to cable may be assumed to be single-conductor wires. In addition, power wires may be assigned to circuit protection. The circuit protection can be defined by type, rating and/or the source electrical bus. The circuit protection and therefore power wire inherit their power characteristics from the bus.

FIG. 5 shows an exemplary diagram of a EWIS model database 108 structure. The data in EWIS model database 108 describes an aircraft both functionally and spatially. The inventors of the present invention have recognized that the interaction between the spatial and functional characteristics of the aircraft is an integral part of the EWIS safety analysis of the present invention and helps to make the EWIS safety analysis different than previous, standard safety analyses that are currently performed on aircrafts. The parallel definitions of the aircraft (spatial and function) in the EWIS model database 108 facilitates the risk analysis of the EWIS.

As shown in FIG. 5, the bottom or most basic level of both the spatial and functional system definitions is located at the wire level 126. For the functional system description in the EWIS model database 108, the next levels are the sub-system level 130, and then the system level 131. Each of these levels is defined below with respect to later figures. The uppermost level is the aircraft 132 level, corresponding to the aircraft as a whole.

The spatial level description, like the functional system description, begins at the wire level 126 and proceeds to the cable level 134. From the cable level 134, the next level is the bundle section level 136, and then the sub-zone level 138. The final level before the aircraft level 132 is the zone level 140. Again, these terms are further defined and illustrated in the figures and associated description that follows.

FIGS. 6-13 provide examples of how the EWIS RAT tool can be used to model the data used in performing the desired comparisons and analyses according to one embodiment of the invention. The description of these embodiments is provided as an example and is merely illustrative in nature. Other embodiments for using the EWIS RAT to perform failure analysis and determine failure probability are within the scope of the invention, as would be recognized by one of ordinary skill in the art.

Figure 6:
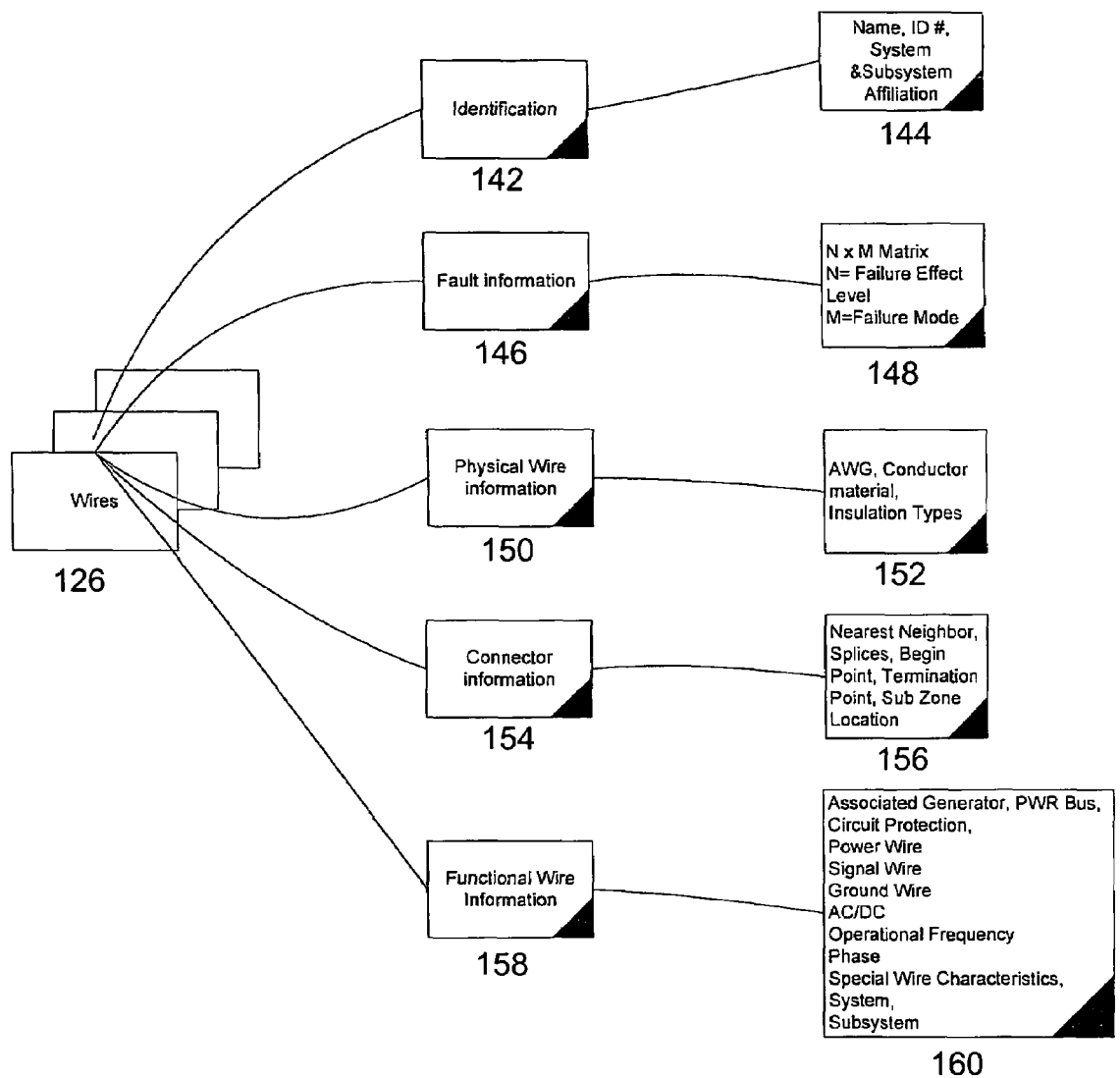
FIG. 6 shows an exemplary diagram of a wire definition in a EWIS model database.

FIG. 6 illustrates one example of how a wire 126 may be defined in the EWIS model database 108 according to the present invention. As previously stated, the wire 126 definition serves as the basis for both the functional and spatial representations of the aircraft electrical system in the EWIS model database 108. The EWIS RAT provides the ability to define wires 126 as pieces of insulated conductors that are routed from one termination to another termination. Additionally, a wire 126 is considered to be a single insulated conductor. However, additional data may be entered into via the EWIS RAT to further specify other characteristics of the wires 126. For example, the boxes on the right-hand portion of FIG. 6 indicate information that may be entered via the RAT user interface 101. The boxes in the center indicate descriptions of the wire's 126 physical composition, role in failure effects and higher level functions. These items together form a complete wire definition 126.

According to one embodiment of the invention, the identification 142 of the wire 126 is provided by populating data elements corresponding to information 144, such as the name, identification number, system, and sub-system affiliation. Fault information 146 is provided by populating data elements corresponding to information 148, such as N×M matrix, where N is the failure effect level and M is the failure mode. Physical wire information 150 is provided by populating data elements corresponding to information 152, such as AWG (gauge), conductor, material, and insulation type. Connector information 154 is provided by populating data elements corresponding to information 156, such as nearest neighbor, splices, begin point, termination point, and sub-zone location. Functional wire information 158 is provided by populating data elements corresponding to information 160 such as associated generator, power bus circuit protection, power wire, signal wire, ground wire, AC/DC, operation frequency, phase, special wire characteristics, system, and sub-system.

Figure 7:
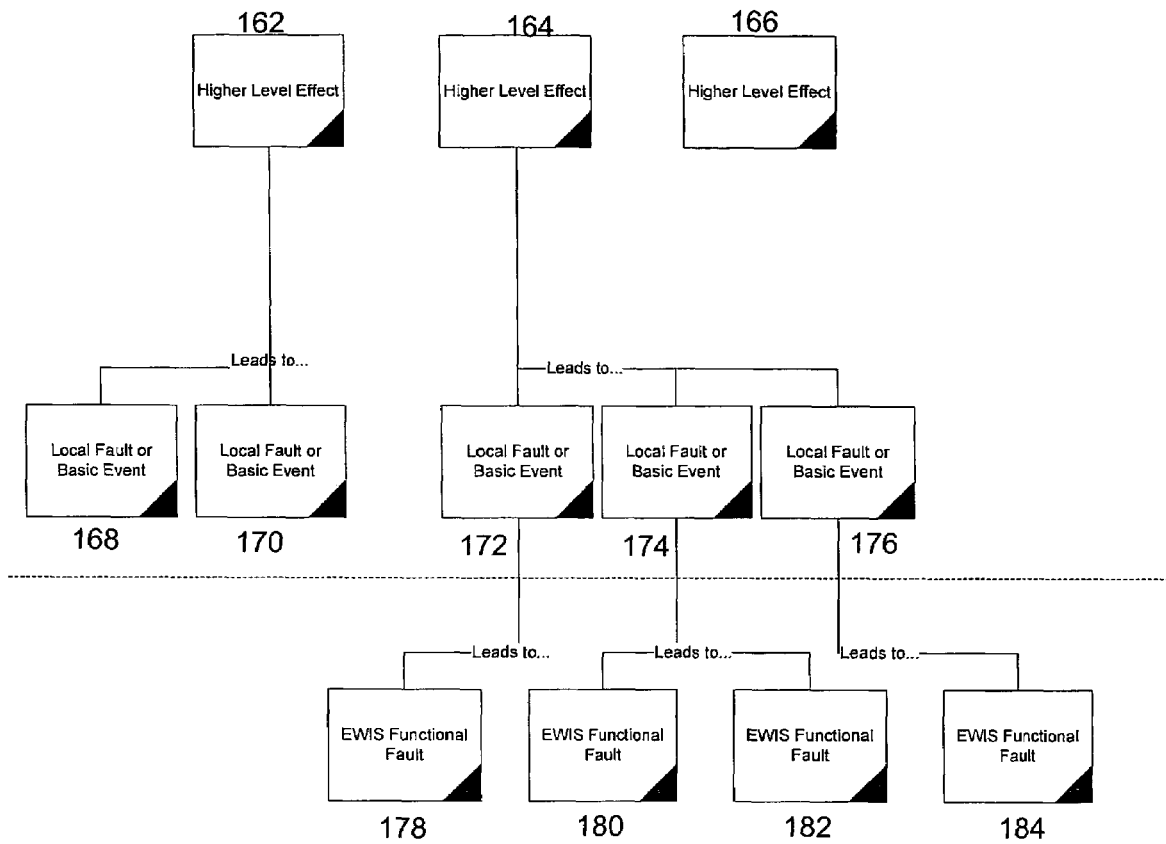
FIG. 7 shows an exemplary diagram of fault structure levels.

FIG. 7 further illustrates a failure effect level depicted in items 146 and 148 of FIG. 6 according to one embodiment of the invention. Here, a fault structure is defined by a user via the RAT user interface 101 and is stored in the EWIS model database 108. The fault tree structure depicted in FIG. 7 is used in generating several of the output reports 106. Higher level effects 162, 164, and 166 are depicted at the upper-most level of this diagram. These correspond to faults that occur at the system level and typically affect the aircraft function. In a standard OEM fault tree, local fault or basic events 168 and 170, which are faults associated with one or several lower level subsystems or bundles, would be the most detailed point of the fault tree analysis. Thus, using conventional approaches there is minimal or no analysis as to the root cause of faults that occur in the EWIS.

Higher level effect 164 illustrates an exemplary embodiment of the fault structure of the present invention. In this embodiment, EWIS functional faults 178-184 lead to a local fault or basic events 172-176. The local fault or basic events 172-176 then lead to higher level effect 164. According to the present invention, a more detailed fault analysis, at the most basic fault level, occurring in the EWIS or wires 126, is undertaken and analyzed. With conventional approaches, using OEM fault trees, the location and repair of specific faults is much more difficult as the location of the fault cannot be determined at the most basic level.

A EWIS wire information entry window, as part of the RAT user interface 101, may be used by the use to create, connect and properly define faults associated with a new wire 126 being added to the model. Thus, the entire fault structure for the aircraft is anchored at the most basic EWIS level: the wire 126. Because fault structure information in the database is built up from the wire level 126, the EWIS RAT of the present invention is able to generate reports that describe the effects of individual wire 126 failures that propagate up the fault structure to higher level failure effects that manifest at the sub-system, system, and aircraft level.

Figure 8:
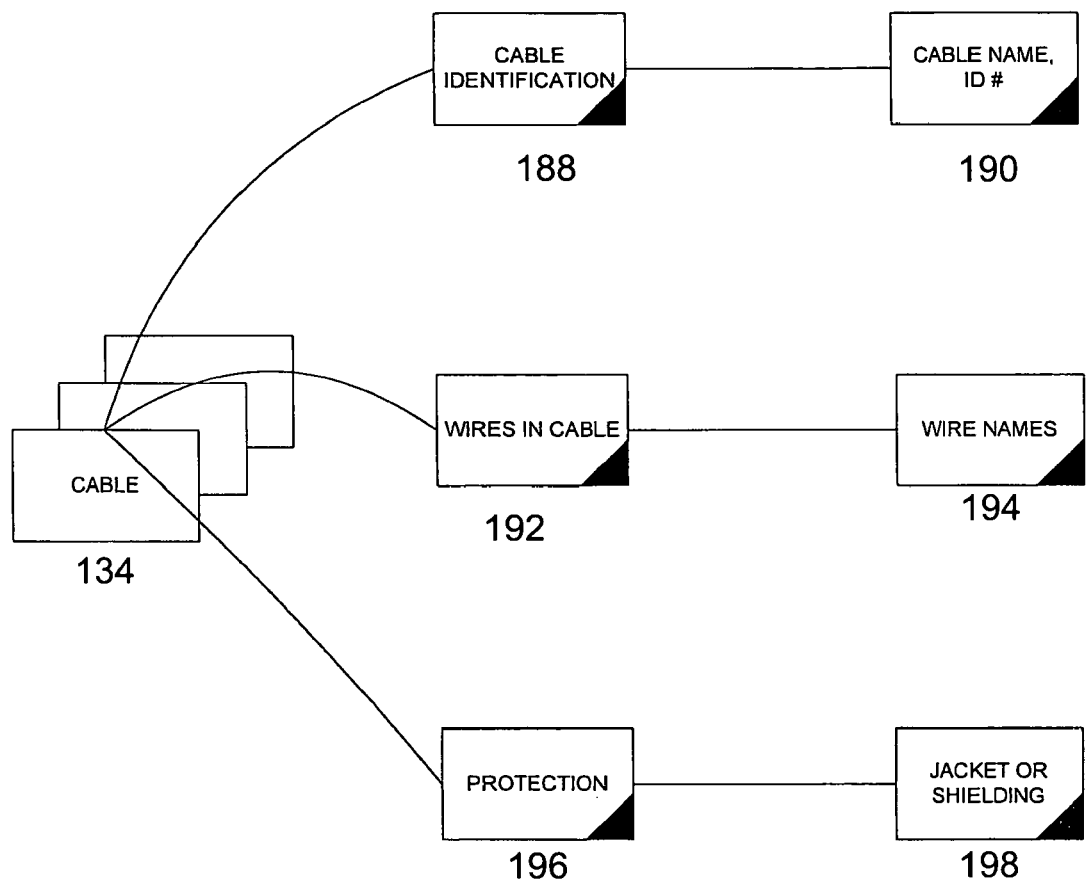
FIG. 8 shows an exemplary diagram of a cable definition in a EWIS model database.

FIG. 8 illustrates one example of how a cable 134 may be defined in the EWIS model database 108 according to the present invention. Cables 134 are at the level above wires 126 in the spatial description of the aircraft electrical system and can be defined in a number of different ways. There are three sets of boxes in FIG. 8, the furthest to the right of the figure illustrating the data elements that are entered by the user via the RAT user interface 101, the center boxes illustrating descriptions of the cable's 134 physical composition, and the far left corresponding to a complete cable 134 definition. Cable identification 188 is provided by populating data elements corresponding to information 190, such as cable name and identification number. Information related to the wires 126 in a cable 192 is provided by populating data elements corresponding to information 194, such as the wire 126 names. Protection 196 information is provided by populating data elements corresponding to information 198, such as the jacket or shielding of the cable 134.

An EWIS cable information entry window, as part of the RAT user interface 101, may be used by a user to enter data regarding cables 134. This data may include cable name, cable shielding, available wires and wires in the cable. Further, a variety of other options and navigation tools may be available via the RAT user interface 101 that allow a user to access other portions of the EWIS RAT and/or edit data maintained in the EWIS model database 108.

Figure 9:
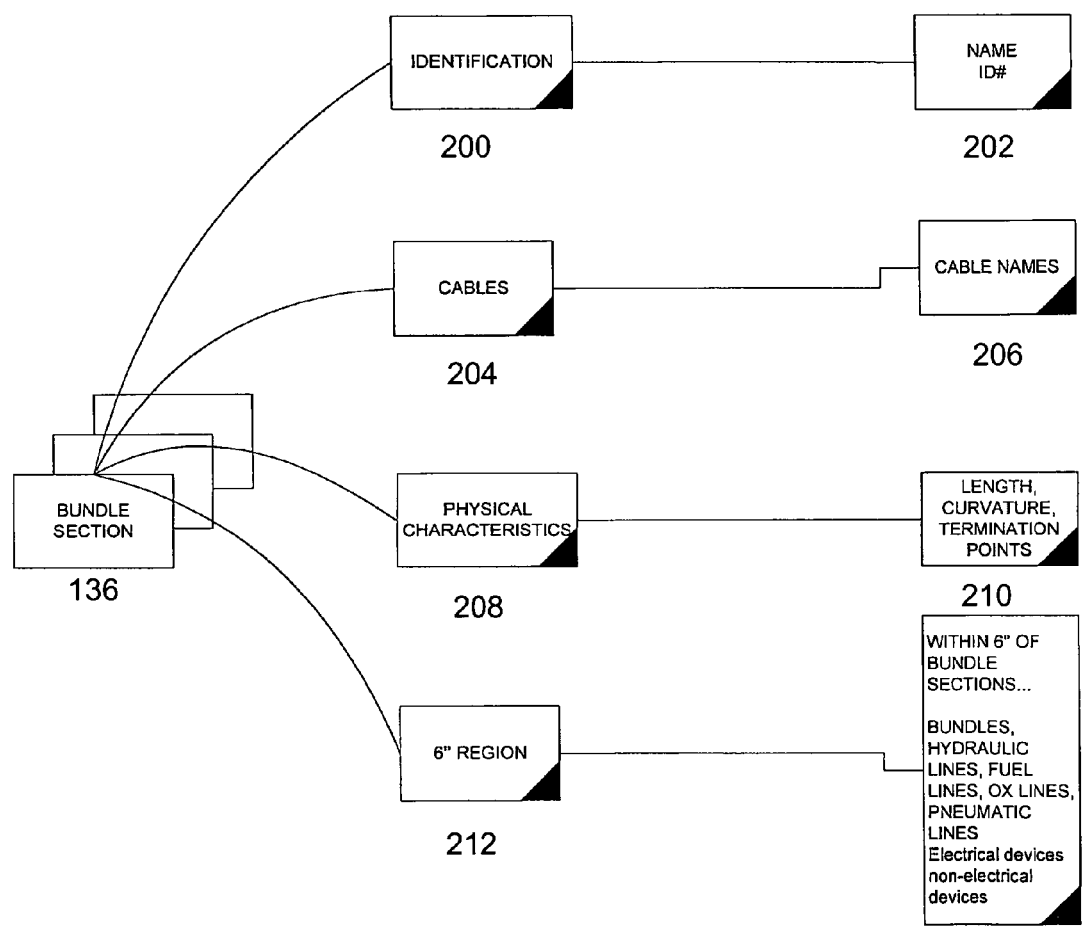
FIG. 9 shows an exemplary diagram of a bundle section definition in a EWIS model database.

FIG. 9 illustrates one example of how a bundle section 136 may be defined in the EWIS model database 108 according to the present invention. Bundle sections 136 are at the level above cables 134 in the spatial description of the aircraft electrical system and may be defined in a number of different ways. A bundle section is a group of wires that runs between two termination points, has no wires added to or subtracted from the bundle between those termination points, and experiences a consistent operating environment between the termination points. There are three sets of boxes in FIG. 9, the furthest to the right of the figure illustrating the data elements that are entered by the user via the RAT user interface 101, the center boxes illustrating descriptions of the bundle section's 136 composition, physical characteristics, and electrical characteristics, and the far left corresponding to a complete bundle section 136 definition. Bundle section identification 200 is provided by populating data elements corresponding to information 202, such as the bundle section name and identification number. Information regarding the cables 204 is provided by populating data elements corresponding to information 206, such as the cable names in the bundle. Physical characteristics 208 information is provided by populating data elements corresponding to information 210, such as length, curvature, and termination points. Information corresponding to a "six inch region" 212 is provided by populating data elements corresponding to information 214, such as items found within a six inch area of a bundle section 136. This information may include data elements identifying information such as other bundles, hydraulic lines, fuel lines, oxygen lines, pneumatic lines, electrical devices and non-electrical devices.

An EWIS bundle section information entry window, as part of the RAT user interface 101, may be used by a user to enter data regarding bundles 136. This data may include a bundle section name, type of bundle, length of a bundle, curvature of a bundle, cables in a bundle and termination points of a bundle. Further, after additional data has been gathered about the wires 126 in an aircraft, many of the reports will now be able to provide useful analysis of the aircraft wiring system. Further, a variety of other options and navigation tools may be available via the RAT user interface 101 that allow a user to access other portions of the EWIS RAT and/or edit data maintained in the EWIS model database 108.

In one embodiment of the present invention, the RAT user interface 101 includes an interface for maintaining bundle section information. Using the interface, data elements may be entered capturing which bundles interface with other bundles. The interfaces between bundles may further be broken down, to capture, for example information related to multi-component/device interfaces, bundle intersections, bundle transitions, zone transitions and the number of bundles in an interface.

The RAT user interface 101 may include additional interfaces through which information regarding a within six inch region 212 may be maintained. Using such an interface, data elements may be entered capturing information such as available bundles, contained equipment and devices, available electrical devices, and other devices within a six inch region of a bundle.

The RAT user interface 101 may include additional interfaces through which components found within the six inch region 212 may be created or edited. The six inch region is taken into account by the RAT application software 103 when considering the potential impact of damage to a bundle near the center of the region. The EWIS RAT application software 103 may then alert a user as to other aircraft sub-system/ system components that may be damaged by a local fire or other discharge of energy resulting from an unplanned EWIS event. It is noted that the "six inch region" is used herein only for exemplary purposes. Any other appropriate distance measurement, could be used to describe this area, as would be understood by one of ordinary skill in the art. An electrical device information window, a non-electrical device information entry window, and a connector information entry window, as part of the RAT user interface 101, may be used by a user to enter data regarding device IDs, system information, sub-system information, master minimum equipment lists (MMEL), device names, device types and device functions. For connectors, information related to the mating frequency for which wires are connected and removed from a given connector may be entered. The RAT user interface may further provide a specification navigation window through which data elements related to connector specifications are maintained. Such an interface enables a user to maintain data elements related to port configurations for a given connector specification. Such data elements may include, for example data on the pin identification, the gauge of the pin, lists and data corresponding to non-neighboring ports, lists and data corresponding to neighboring ports, and lists and data corresponding to next nearest neighboring ports. Neighboring port information can be a listing of pins that have already been defined as being neighbors with a current pin; next neighboring ports can be those adjacent to neighboring pins, and non-neighboring ports can be a list of other pins in a current connector specification which have neither been defined as neighbors or next nearest neighbors of the current pin. Other interfaces provided by the RAT user interface 101 may provide for maintaining data related to generator information, power bus information, circuit protection information, splice information and fault information.

Figure 10:
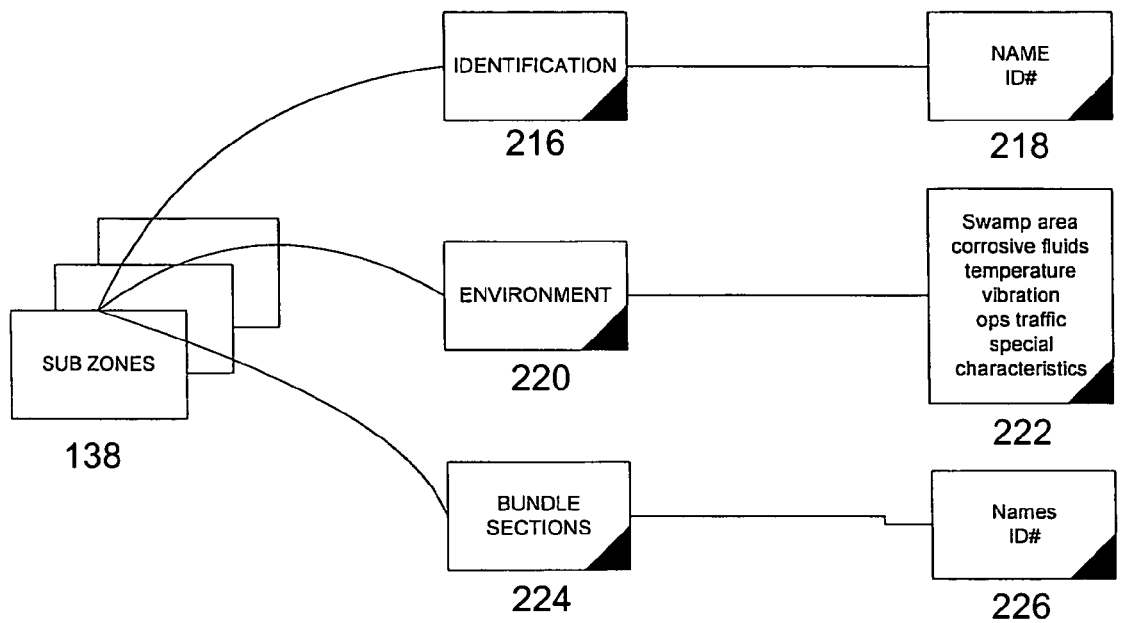
FIG. 10 shows an exemplary diagram of a sub-zone definition in a EWIS model database.

FIG. 10 illustrates one example of how a sub-zone section 138 may be defined in the EWIS model database 108 according to the present invention. Sub-zone sections 138 are at the level above bundle sections 136 in the spatial description of the aircraft electrical system and may be defined in a number of different ways. There are three sets of boxes in FIG. 10, the furthest to the right of the figure illustrating the data elements that are entered by the user via the RAT user interface 101, the center boxes illustrating descriptions of the sub-zone's 138 environmental characteristics and devices, and the box on the far left corresponding to a complete sub-zone 138 definition. Sub-zone identification 216 is provided by populating data elements corresponding to information 218, such as the name and identification number of the sub-zone. Information related to the environment 220 of the sub-zone 138 is provided by populating data elements corresponding to information 222, such as SWAMP (Severe Wind and Moisture Prone) area, corrosive fluids, temperature, vibration, OPS traffic and special characteristics. Because environmental information is attached to a sub-zone of EWIS model database 108, the EWIS RAT is able to correlate a wire with its operating environment, which is useful when undertaking certain analyses. An individual wire failure rate can therefore be assigned based on local environmental operating conditions because the EWIS model database 108 maintains information through with the RAT application software 103 can correlate wire, operating environment, and system/sub-system affiliation. Thus, the EWIS RAT can analyze how likely wires are to fail and how those failures will ripple up the fault tree to cause higher system failure effects. Bundle sections 224 may include information 226 such as names and identification numbers.

Figure 11:
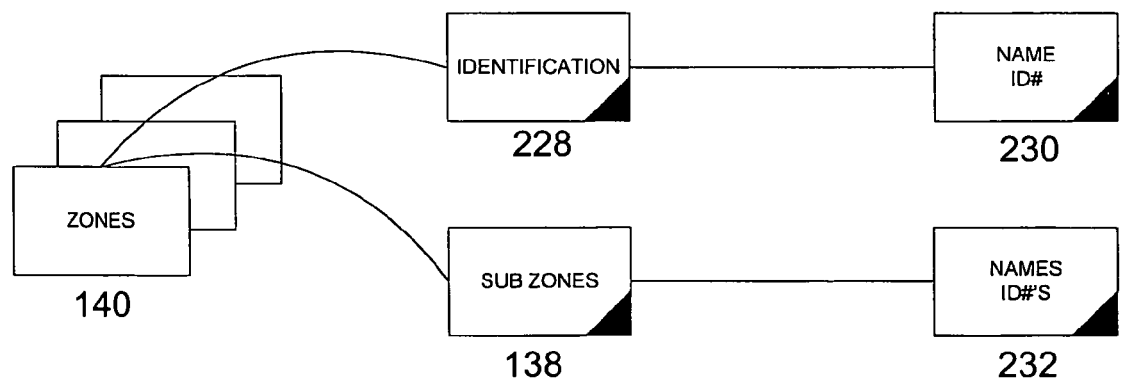
FIG. 11 shows an exemplary diagram of a zone definition in a EWIS model database.

FIG. 11 illustrates one example of how a zone section 140 may be defined in the EWIS model database 108 according to the present invention. Zone sections 140 are at the level above sub-zones 136 in the spatial description of the aircraft electrical system and may be defined in number of different ways. There are three sets of boxes in FIG. 11, the furthest to the right of the figure illustrating the data elements that are entered by the user via the RAT user interface 101, the center boxes illustrating descriptions of the zone's 140 composition, and the box on the far left corresponding to a complete zone 140 definition. Zone identification 228 is provided by populating data elements corresponding to information 230, such as the name and identification number of the zone. Sub-zones 138 information is provided by populating data elements corresponding to information 232, such as names and identification numbers.

An interface for maintaining sub-zones 138 and zones 140, as part of the RAT user interface 101 may be used by a user to create new zones and sub-zones as well as describe zones and sub-zones in detail. Information that may be provided to describe zones and sub-zones in the EWIS model database 108 includes, but is not limited to, names, locations, descriptions, operating temperatures and surrounding environmental conditions, such as what the zone or sub-zone is proximate to or what potential hazards are located nearby. Further, a variety of other options and navigation tools may be available via the RAT user interface 101 that allow a user to access other portions of the EWIS RAT and/or edit data maintained in the EWIS model database 108.

Figure 12:
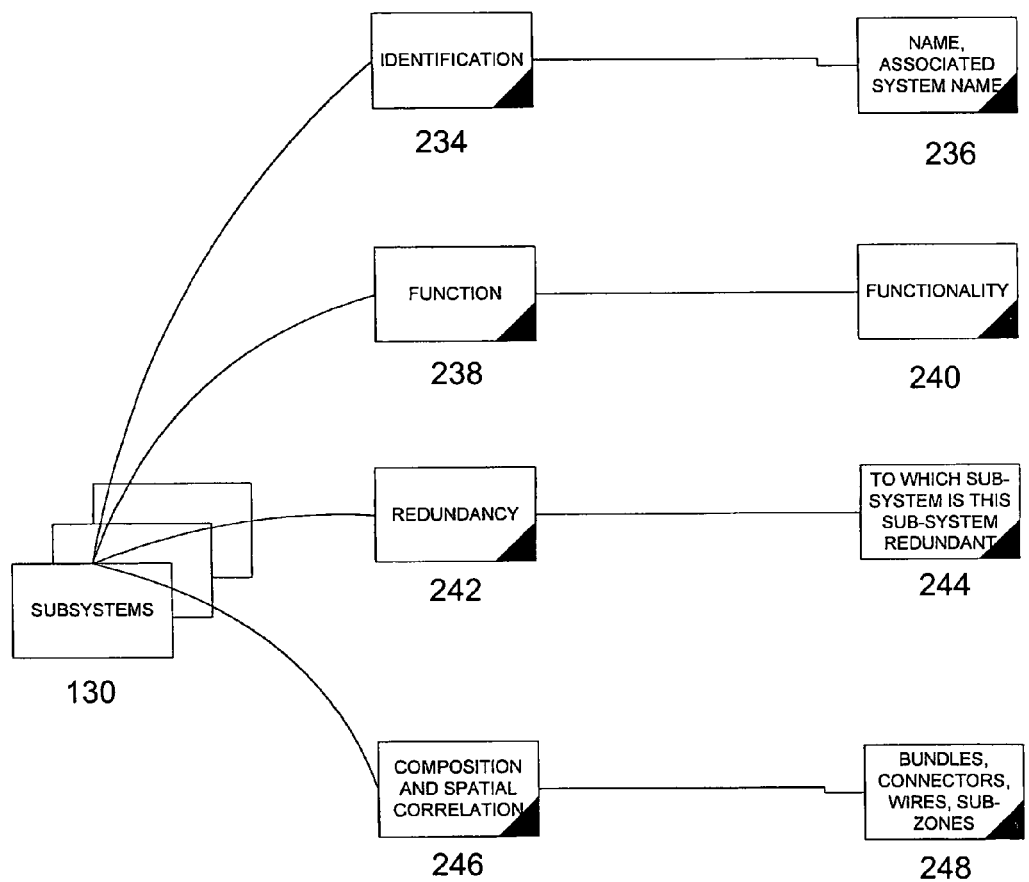
FIG. 12 shows an exemplary diagram of a sub-system definition in a EWIS model database.

FIG. 12 illustrates one example of how a sub-system 130 may be defined in the EWIS model database 108 according to the present invention. The sub-system 130 is at the level above the wire level in the functional description of the EWIS and may be defined in a number of different ways. There are three sets of boxes in FIG. 12, the furthest to the right of the figure illustrating the data elements that are entered by the user via the RAT user interface 101, the center boxes illustrating descriptions of the sub-system's 130 identification, function, redundancy, composition, and spatial correlation, and the box on the far left corresponding to a complete sub-system 130 definition. Sub-system identification 234 is provided by populating data elements corresponding to information 236, such as the name of the sub-system and the name of the associated system. Information related to the function 238 is provided by populating data elements corresponding to information 240, such as functionality. Information related to redundancy 242 is provided by populating data elements corresponding to information 244, such as to which sub-system is this sub-system redundant. Information related to composition and spatial correlation 246 is provided by populating data elements corresponding to information 248, such as bundles, connectors, wires and sub-zones.

An EWIS sub-system information entry window, as part of the RAT user interface 101, may be used by a user to maintain data fields for both creating a new sub-system and for properly describing a sub-system. Additionally, the RAT user interface may provide a quick reference for sub-system information, providing information such as which connectors the wires for a given sub-system are connected through. Data related to sub-systems maintained via the RAT user interface 101 may include redundancy information, checks and maintenance procedures, EWIS components, devices, equipment and associated sub-systems. Further, a variety of other options and navigation tools may be available via the RAT user interface 101 that allow a user to access other portions of the EWIS RAT and/or edit data maintained in the EWIS model database 108.

Figure 13:
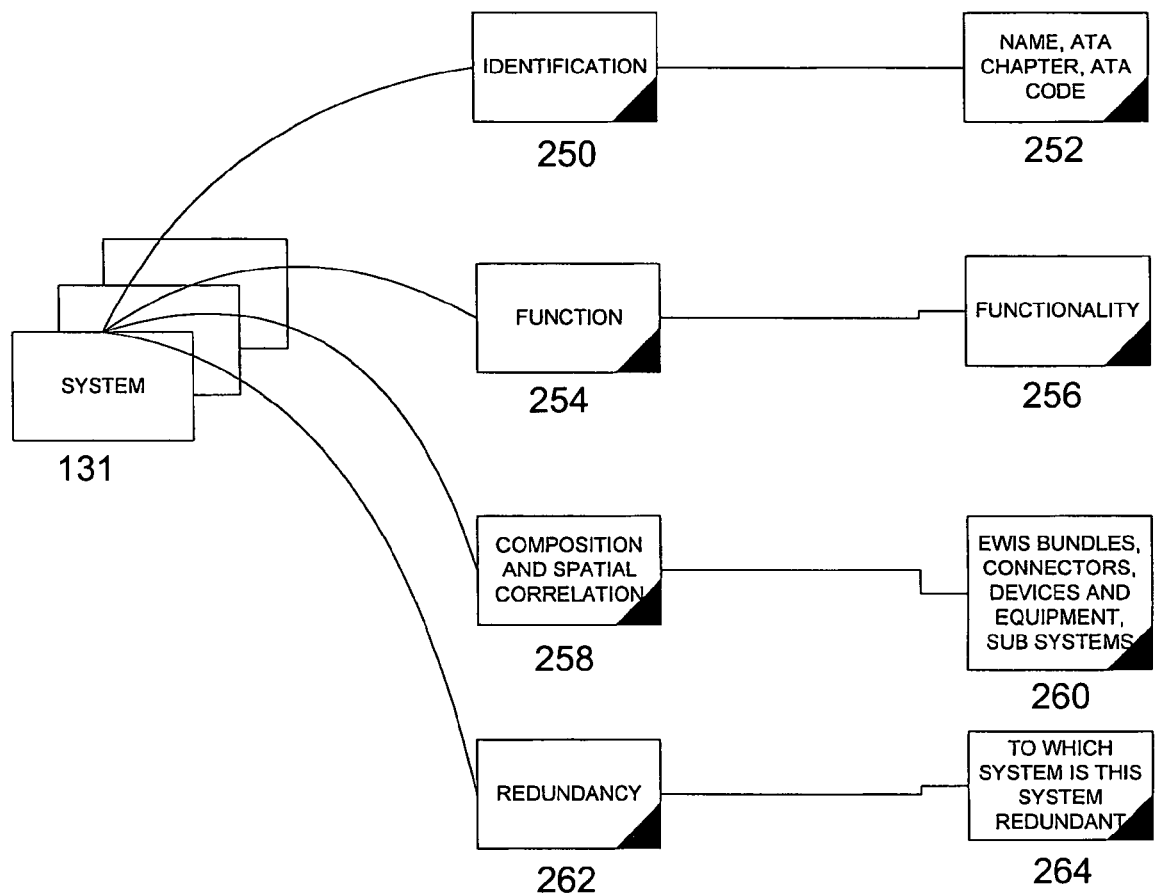
FIG. 13 shows an exemplary diagram of a system definition in a EWIS model database.

FIG. 13 illustrates one example of how a system 131 may be defined in the EWIS model database 108 according to the present invention. The system 131 description is at the highest level in the functional description below the aircraft 132, and may be defined in a number of different ways. There are four sets of boxes in FIG. 13, the furthest to the right of the figure illustrating the data elements that are entered by the user via the RAT user interface 101, the center boxes illustrating descriptions of the system's 131 identification, function, redundancy, composition, and spatial correlation and the box on the far left corresponding to a complete system 131 definition. System identification 250 is provided by populating data elements corresponding to information 252, such as the name of the associated system. Information related to the function 254 of the system is provided by populating data elements corresponding to information 256, such as functionality. Information related to composition and spatial correlation 258 of the system is provided by populating data elements corresponding to information 260, such as EWIS bundles, connectors, devices and equipment, and sub-systems. Information related to redundancy 262 is provided by populating data elements corresponding to information 264, such as to which system is this system redundant.

An EWIS system 131 entry window, as part of the RAT user interface 101, may be used by a user to create new systems and input a proper description of a system. This data may include, for example, components and wires associated with that system. The RAT user interface 101 may also provide a quick reference for information, such as information regarding which connectors the wires for a given system are connected through. Additional data elements related to systems may be maintained through the RAT user interface 101, including redundancy, checks and maintenance procedures, EWIS components, devices, equipment and associated sub-systems. Further, a variety of other options and navigation tools may be available that allow a user to access other portions of the EWIS RAT and/or edit data maintained in the EWIS model database 108.

Figure 14:
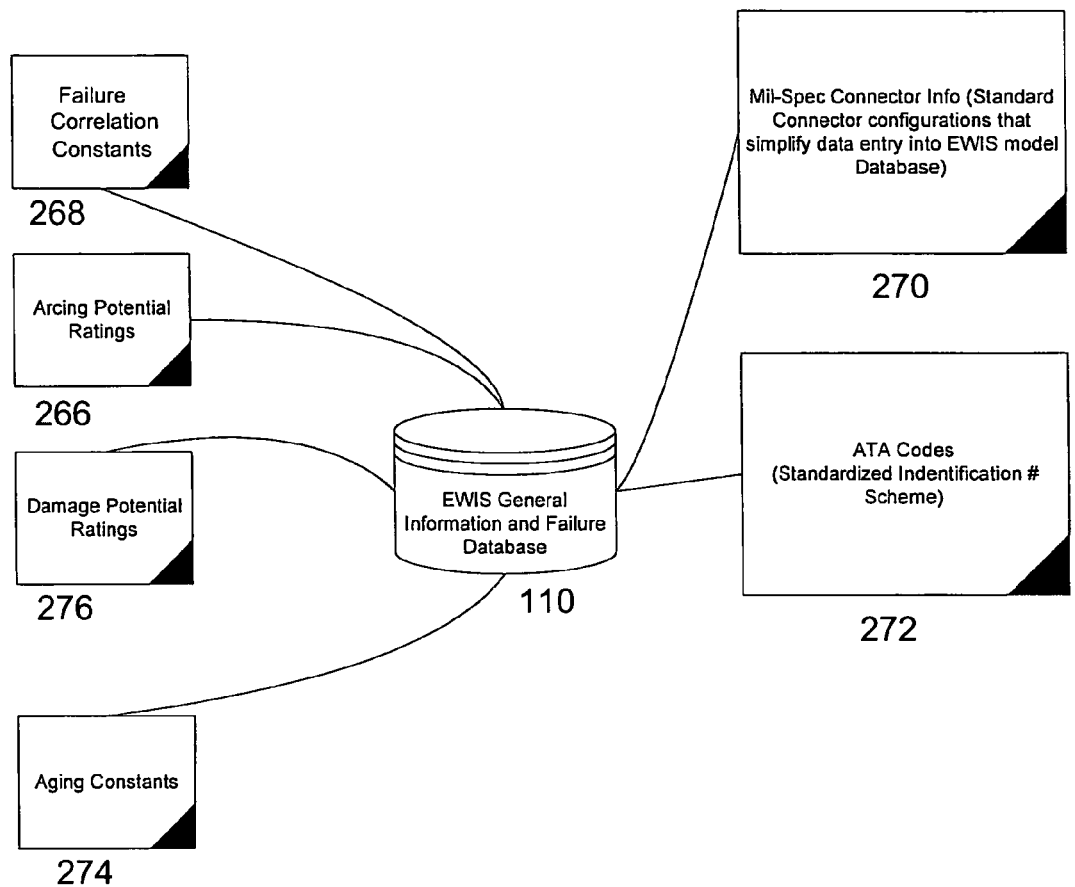
FIG. 14 shows an exemplary diagram of a EWIS failure and general information database.

FIG. 14 illustrates the EWIS failure and general information database 110. The EWIS failure and general information database 110 stores failure information about EWIS components. The information in this database may include arc track potential ratings 266, failure correlation constants 268, military spec connector information 270 (i.e. standard connector configurations that simplify data entry into EWIS model database 108), ATA codes 272 (i.e. standardized identification number scheme), aging constants 274 and damage potential ratings 276.

A failure correlation constant 268 can be environmental, physical, or operational. The failure correlation constant 268 weights the importance of an environmental, physical, or operational characteristic of a wire in determining the wire's failure rate probability. The paired comparison technique is one method of assessing failure correlation constants 268. As would be understood by those of ordinary skill in the art, other techniques for assessing failure correlation constants 268 remain within the scope of the present invention.

Figure 16:
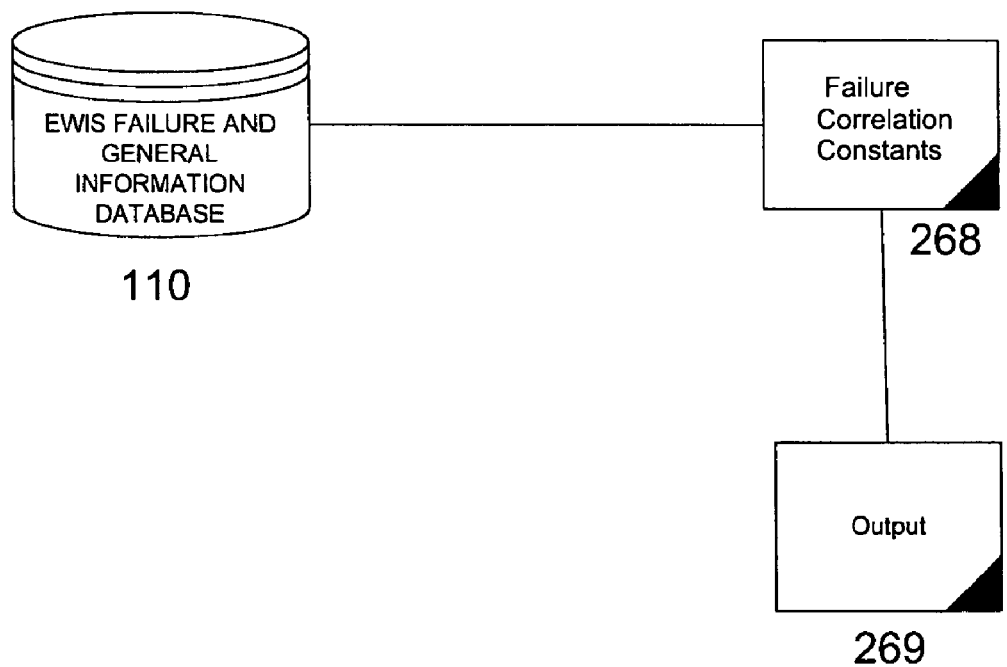
FIG. 16 shows an exemplary diagram of paired comparison coefficients.

In the context of FIGS. 14 and 16, the failure correlation constants 268 will be discussed as paired comparison coefficients being used in a paired comparison technique in the EWIS RAT. The paired comparison technique is an alternative method for gaining an understanding of the relationship between the severity of the environment and the probability of wire failure. The inventors of the present invention have recognized that such an approach is useful because historical failure rates are unavailable and recreating realistic operating environments in a laboratory is very difficult. The inventors have determined that paired comparison coefficients provide a manner of generating accurate failure probabilities of different aircraft models without the extreme difficulty of artificially generating in-flight conditions affecting a EWIS system. As would be understood by those of ordinary skill in the art, techniques other than a paired comparison technique could be used to fill in incomplete and/or unreliable historical data while remaining within the scope of the invention.

Figure 15:
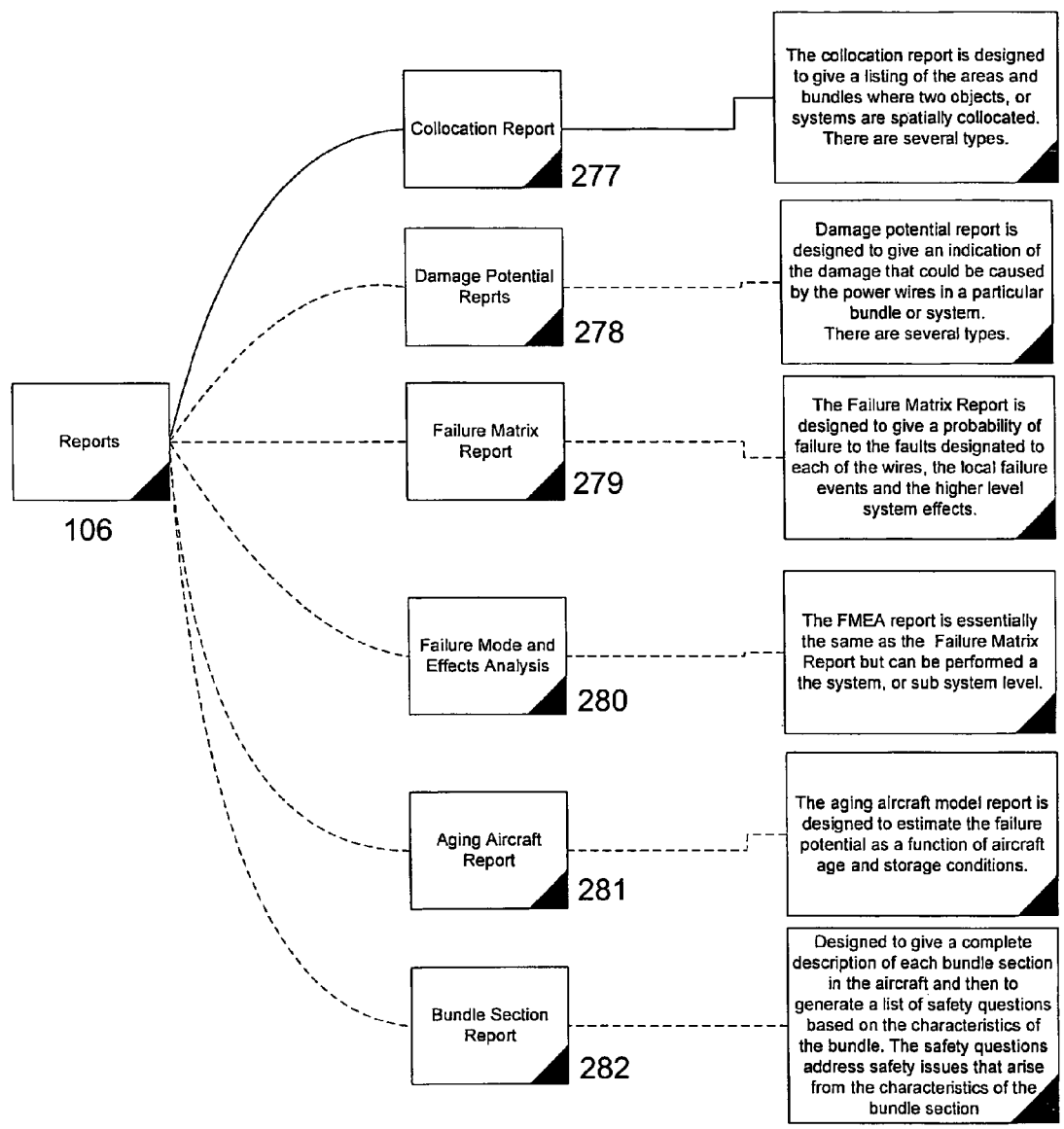
FIG. 15 shows an exemplary diagram of report options for the EWIS RAT.

FIG. 15 illustrates exemplary reports that the RAT application software 103 and the RAT report mechanism 104 may produce. In generating each of these exemplary reports (277, 278, 279, 280, 281, 282), the RAT application software 103 and the RAT report mechanism 104 access information from the EWIS model database 108 and/or the EWIS failure and general information database 110.

A collocation report 277 provides a listing of where two objects or systems are spatially collocated. A damage potential report 278 gives an indication of the damage that could be caused by the power wires in a particular bundle or system. A failure matrix report 279 gives a probability of failure to the faults designated to each of the wires, the local failure events and the higher level system effects. A failure mode and effects analysis report 280 is similar to the failure matrix report 279, but is performed on the system or sub-system level. An aging aircraft report 281 estimates the failure potential for a particular fault as a function of aircraft age and storage conditions. A bundle section report 282 gives a complete description of each bundle section in the aircraft and then generates a list of safety questions based on the characteristics of the bundle. The safety questions in this report address safety issues that arise from the characteristics of the bundle section. The user can annotate the bundle section report via the RAT user interface 101 to clarify safety principles and risk mitigation techniques needed to prove safety of the individual bundle section.

Any report generated by the EWIS RAT may be viewed by the user in a variety of manners. In one embodiment, the program displays the report in spreadsheet format and viewable using a commercially available application, such as Microsoft© Excel. In another embodiment, the EWIS RAT report mechanism 104 generates the report in standard hypertext markup language (HTML) format viewable in a web browser. In another embodiment, a report is sent directly to a printer to provide a user with a hard copy of a report. Any other known viewing techniques may also be utilized to display a report.

analytic calculations. The EWIS RAT may then provide an output 267 including a determination of whether there is an arc track potential for a wire, a group of wires, a bundle zone, a sub-system, a system, et cetera. An exemplary table that may be used in calculating arc track potential ratings is shown below in Table 2. The algorithms and techniques described herein represent a one embodiment of the arc track potential ratings. The specific algorithm described herein is one exemplary way to correlate the electrical characteristics of a wire or group of wires to the likelihood of an arc track event. An arc track event is distinguished from an arcing event in that the arc track is an arc that propagates a certain distance along a wire or group of wires and may bridge to adjacent devices and structures.

TABLE 2

| Wire ID | Insulation Type | Circuit protection | Gauge | Power Bus | Voltage | Length of Arc Track | Number of Wires Damaged in Bundle | Arcing Potential (Y/N) |
| --- | --- | --- | --- | --- | --- | --- | --- | --- |
| Wire A | Poly-imide | Circuit breaker | 20 | power bus ID | 5 V | 4" | 3 | Y |
| Wire B | | | | | | | | |
| Wire N | | | | | | | | |

FIG. 16 illustrates that environmental, physical, and operational failure correlation coefficients are maintained by the EWIS RAT in the EWIS failure and general information database 110. The coefficients are selectively queried from the EWIS failure and general information database 110 when the RAT application software 103 performs a failure matrix, FMEA report or aging model report. As discussed above, the paired comparison technique is one method of obtaining the environmental, physical and operational failure coefficients used in the analysis. Paired comparison coefficients (failure correlation constants 268) may be shown as output 269 in an N×M matrix, where N represents aspects of the operating environment in the sub-zone where the wire is located and M represents the failure mode. An exemplary table showing an N×M matrix is shown below in Table 1.

TABLE 1

| | Environmental Factors | | Physical Wire Attributes | |
| --- | --- | --- | --- | --- |
| Failure Mode | Temperature | Vibration | Gauge | Insulation Type |
| Short wire-to-wire | $W_{1,1}$ | $W_{2,1}$ | $W_{3,1}$ | $W_{4,1}$ |
| Short wire-to-ground | $W_{1,2}$ | $W_{2,2}$ | $W_{3,2}$ | $W_{4,2}$ |
| Short wire-to-structure | $W_{1,3}$ | $W_{2,3}$ | $W_{3,3}$ | $W_{4,3}$ |

In Table 1, each weight ($W_{x,y}$) is a measure of the significance of that environmental factor or physical wire attribute (x) in causing the wire to fail according to a specified failure mode (y). These weights are determined by the paired comparison technique.

Figure 17:
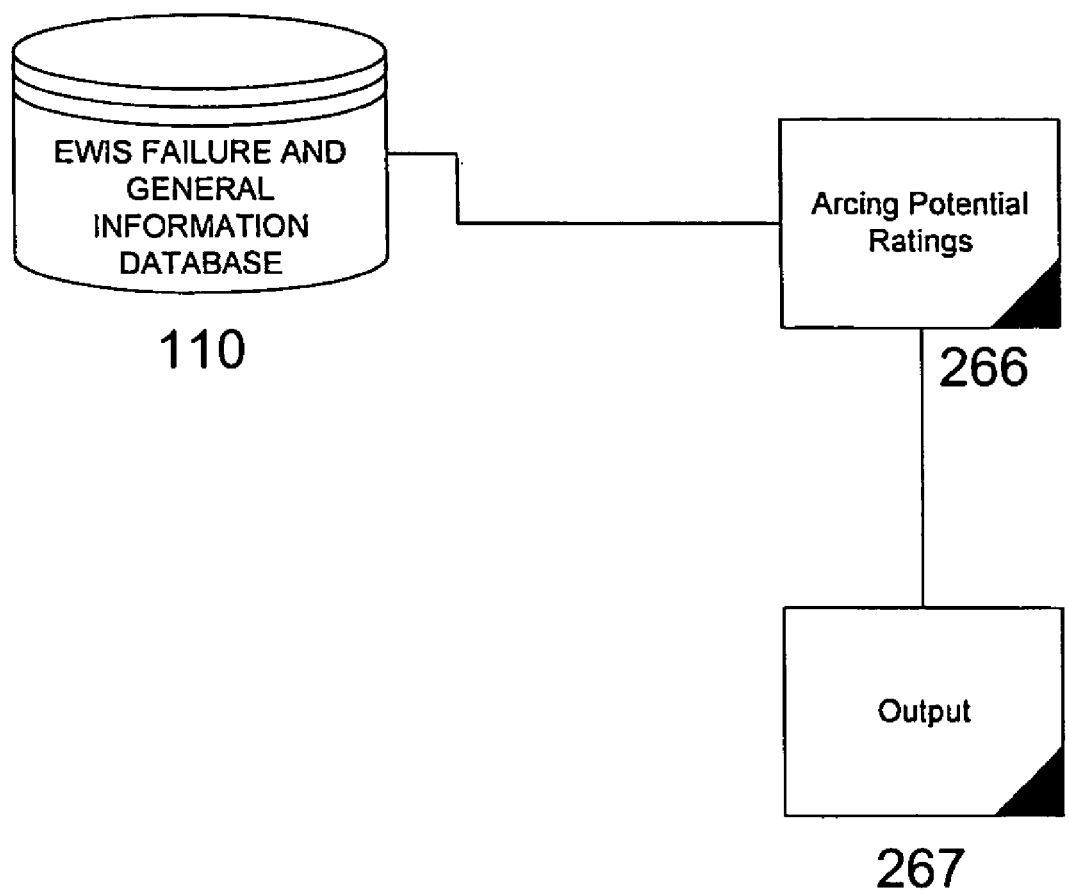
FIG. 17 shows an exemplary diagram of an arc potential rating.

FIG. 17 illustrates that arc potential ratings are maintained by the EWIS RAT in the EWIS failure and general information database 110. Arc potential ratings are calculated experimentally in a laboratory and are stored as a matrix of coefficients. Similar to above, arc potential ratings 266 stored in the EWIS failure and general information database 110 are accessed by the RAT application software 103 and used in In Table 2, values for the length of the arc track and the number of other wires damaged in a bundle may be determined based on the electrical characteristics of the wire or bundle. The arc track and number of other wires damaged in a bundle can be referred to as damage indicators. If a wire's operating attributes result in damage indicators exceeding a specified threshold value (that may be experimentally determined), then the wire is given an arc track potential=YES; otherwise, a wire is given an arc track potential=NO. For example, consider a first wire (Wire A) having a certain set of operating attributes that has been experimentally determined to generally result in an arc length of four inches. Such a four inch arc can damage up to three nearby wires. The arc track potential ratings for each wire is retrieved from the EWIS failure and general information database 110 and used in calculations that determine the arc track potential of an entire bundle section sub-system, system or zone.

Figure 18:
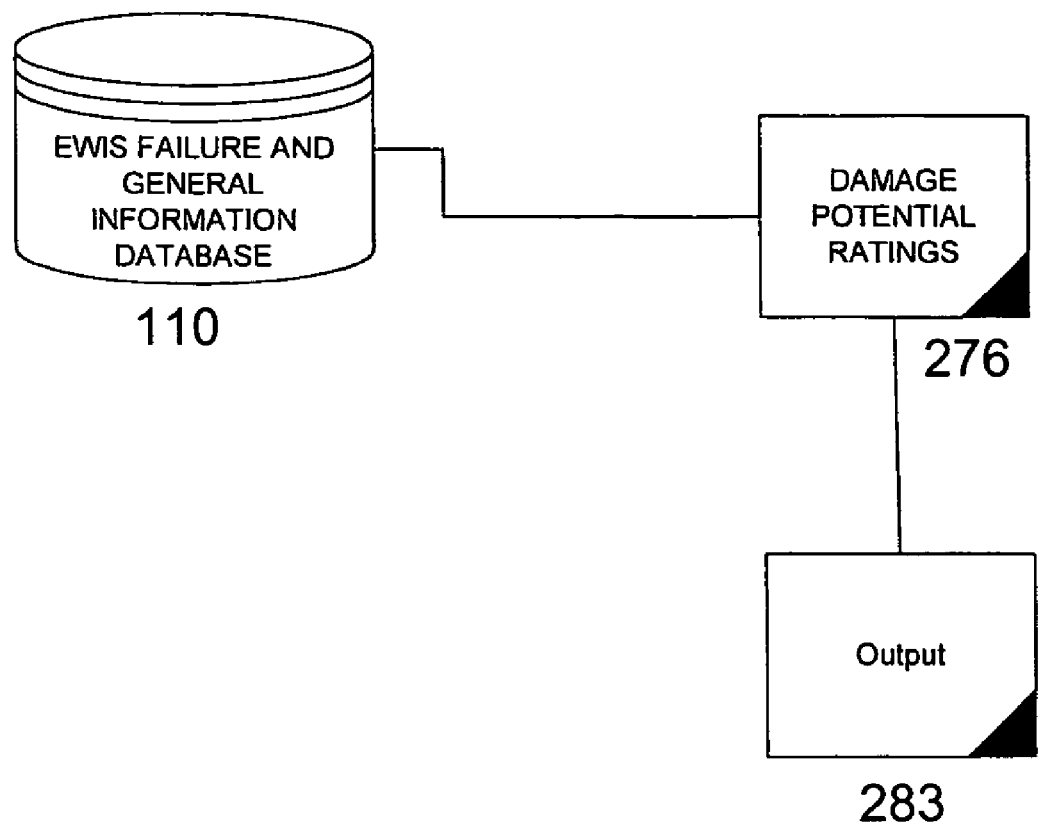
FIG. 18 shows an exemplary diagram of damage potential ratings.

FIG. 18 illustrates that damage potential ratings are maintained in the EWIS failure and general information database 110. To calculate a damage potential rating for a group of wires, a matrix of coefficients is stored in EWIS failure and general information database 110. Similar to above, damage potential ratings 276 stored in the EWIS failure and general information database 110 are accessed by the RAT application software 103 and used in analytic calculations. Damage potential ratings 276 can be a rating between 1 and 7 that correlate the amount of material that would be incinerated in the event that an electrical arc occurs in a wire with a given set of electrical characteristics. This data is stored, for example, in a table including the characteristics of a particular wire, such as insulation type, circuit protection, gauge, power bus, voltage, and destruction $mm^3$. These factors are combined and analyzed, and a particular wire is then given an output 283 value corresponding to its damage potential of between one and seven. An exemplary table showing a damage potential scale is shown below in Table 3.

TABLE 3

| Amount of Incinerated Material | Damage Potential Ratings |
|---|---|
| 0-1 mm^3 | 1 |
| 1-10 mm^3 | 2 |
| 10-100 mm^3 | 3 |
| 100-1000 mm^3 | 4 |
| 1000-2000 mm^3 | 5 |
| 2000-5000 mm^3 | 6 |
| 5000-10000 mm^3 | 7 |

Figure 19:
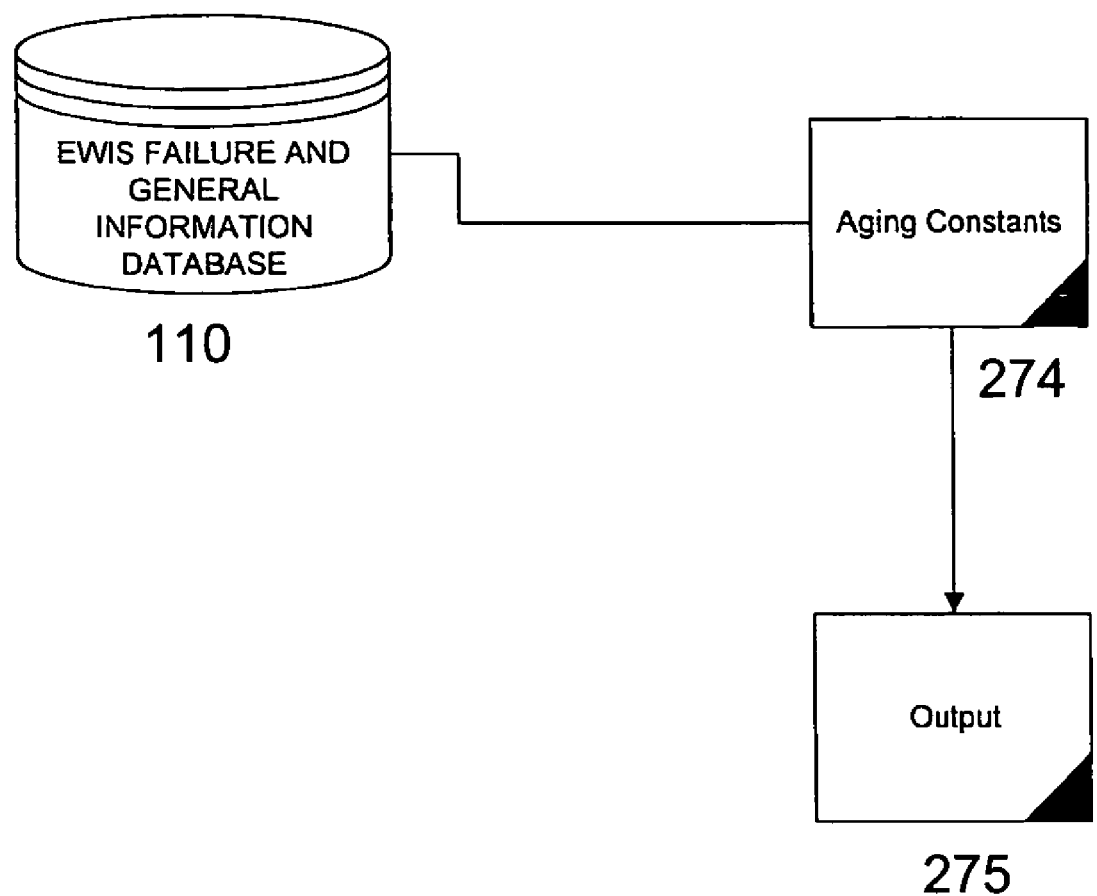
FIG. 19 shows an exemplary diagram of aging constants.

FIG. 19 illustrates that aging constants are maintained in the EWIS failure and general information database 110. To show aging constants, a matrix of coefficients is stored in EWIS failure and general information database 110. Similar to above, aging constants 274 stored in the EWIS failure and general information database 110 are accessed by the RAT application software 103 and used in analytic calculations. For every combination of environmental factors that define a sub-zone, a matrix may be determined that contains aging constants 274 that correspond to wire degradation as a function of the exposure time to the operating environment. Aging constants can be used in an aging aircraft model report. Two exemplary tables showing the environmental factors used in determining aging constants are shown below in Tables 4 and 5. In Table 4, one group of environmental factors (Temp=X, Humidity=Y) results in one set of constants ($Z_1 \ldots Z_7$), and in Table 5, another Set of environmental factors (Temp=A, Humidity=B) results in another set of aging constants ($C_1 \ldots C_7$). These relationships are developed in the laboratory.

TABLE 4

| Environmental Factors | |
|---|---|
| Temp = X Exposure Time (years) | Humidity = Y Aging Constant |
| 0 | $A_1$ |
| 1 | $A_2$ |
| 2 | $A_3$ |
| 3 | $A_4$ |
| 4 | $A_5$ |
| 5 | $A_6$ |
| 6 | $A_7$ |

TABLE 5

| Environmental Factors | |
|---|---|
| Temp = A Exposure Time (years) | Humidity = B Aging Constant |
| 0 | $A_1$ |
| 1 | $A_2$ |
| 2 | $A_3$ |
| 3 | $A_4$ |
| 4 | $A_5$ |
| 5 | $A_6$ |
| 6 | $A_7$ |

These tables are used to calculate and assign an aging constant for use in an output report 275. Although the paired comparison technique is used to find the failure rates for wires because it is difficult to obtain such rates from historical data and laboratory experiments, aging constants, such as those shown above, may be determined from laboratory data. This is because aging constants describe how the failure rates change over time or age, which may be generalized from earlier laboratory experiments as most aging takes place on the ground in an aircraft hangar and is due to factors that are relatively constant (e.g. in a climate controlled hangar). The inventors of the present invention have recognized that failure rates, on the other hand, are dependent on a complex network of factors that are constantly changing and affecting the wire while it is in use, thus making them more difficult to determine experimentally.

Figure 20:
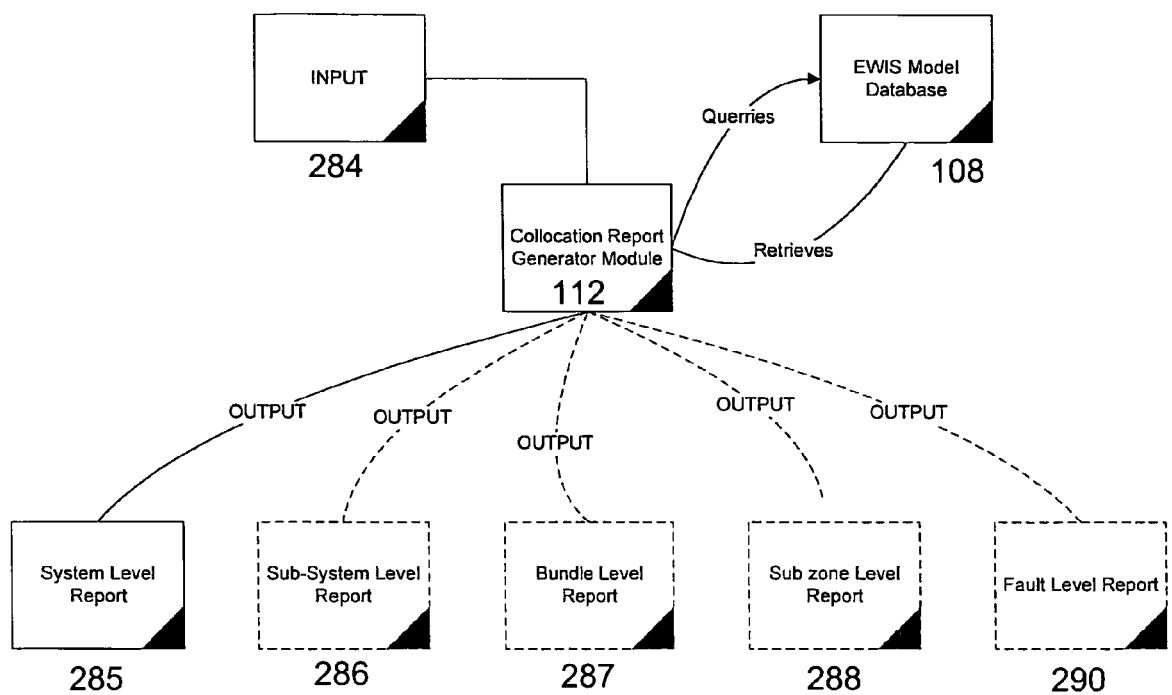
FIG. 20 shows an exemplary diagram of the generation of a collocation report.

FIG. 20 illustrates the generation of a collocation report according to the present invention. Input 284 provided by the user via the RAT user interface 101 is sent to collocation report generator module 112. Collocation report generator module 112 of the RAT application software 103 queries EWIS model database 108 in order to generate one or more of a variety of collocation reports via the RAT report mechanism 104. Examples of collocation reports are system level report 285, sub-system level report 286, bundle level report 287, sub-zone level report 288 and fault level report 290.

Figure 21:
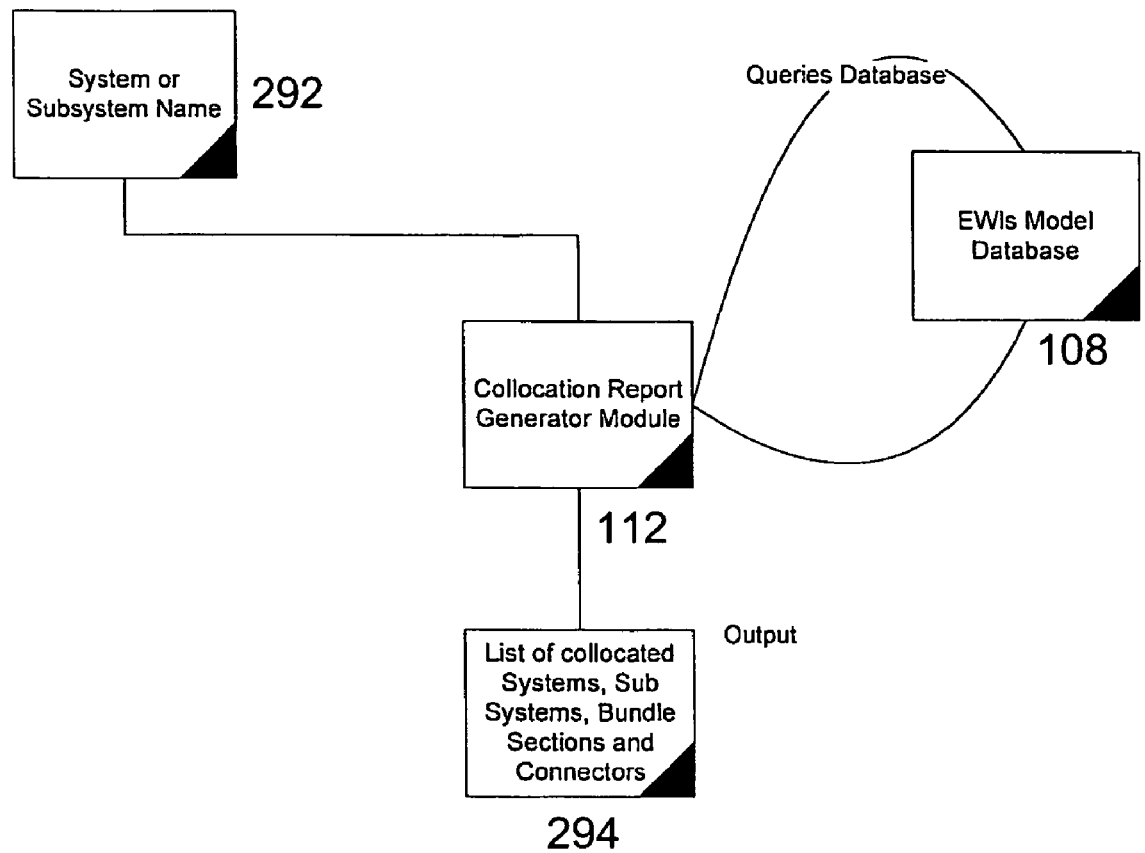
FIG. 21 shows an exemplary diagram of the inputs and outputs used in the generation of a collocation report for a system or sub-system.

FIG. 21 illustrates the collocation report input and output for a system or sub-system according to the present invention. In the system and sub-system collocation reports, the input 292 may be the name of the system or the subsystem. Input 292 is sent to collocation report generator module 112. Collocation report generator module 112 queries EWIS model database 108 in order to generate the output 294. Output 294 includes, for example, a list of all collocated systems, sub-systems, bundles, sections and/or connectors that are physically adjacent to input 292 throughout the entire aircraft.

Figure 22:
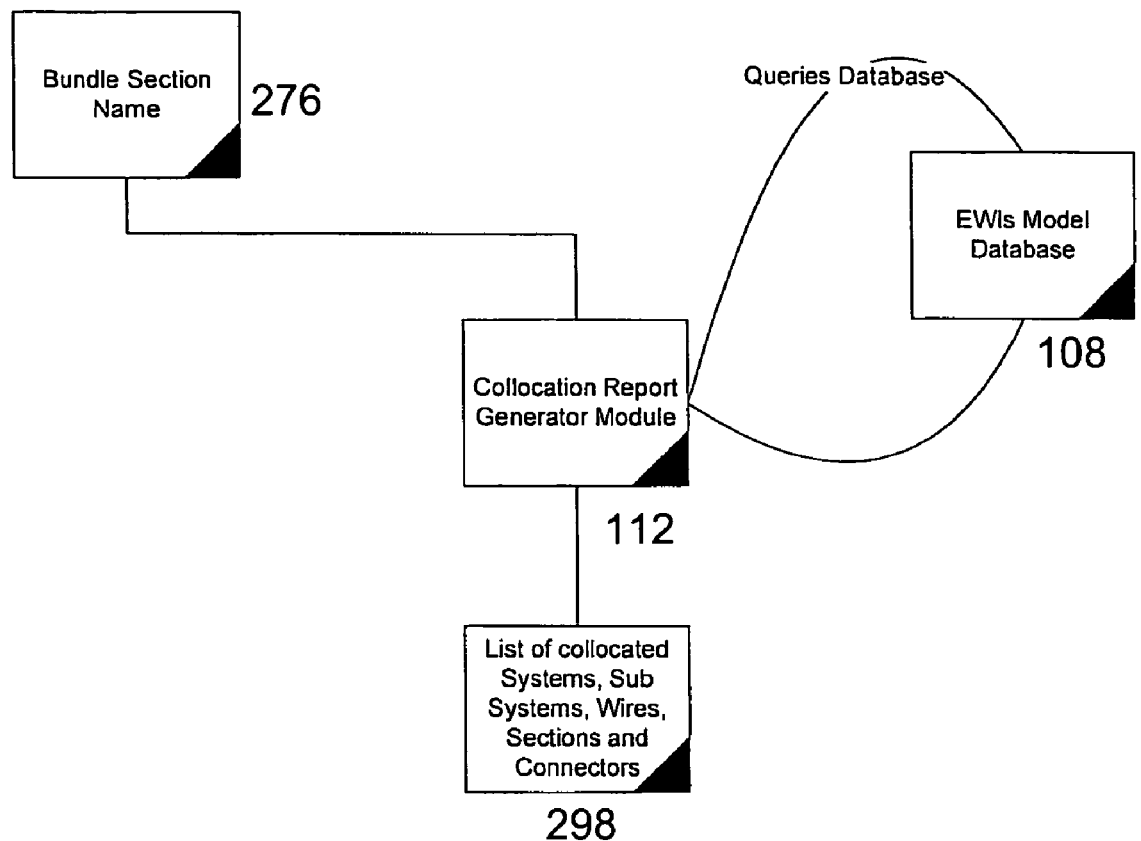
FIG. 22 shows an exemplary diagram of the inputs and outputs used in the generation of a collocation report for a bundle section.

FIG. 22 illustrates the collocation report input and output for a bundle section according to the present invention. In the bundle section collocation reports, the input 276 may be the name of the bundle section. Input 276 is sent to collocation report generator module 112. Collocation report generator module 112 queries EWIS model database 108 in order to generate the output 298. Output 298 includes, for example, a list of all collocated systems, sub-systems, wires, sections and/or connectors that are physically adjacent to input 276 throughout the entire aircraft.

Figure 23:
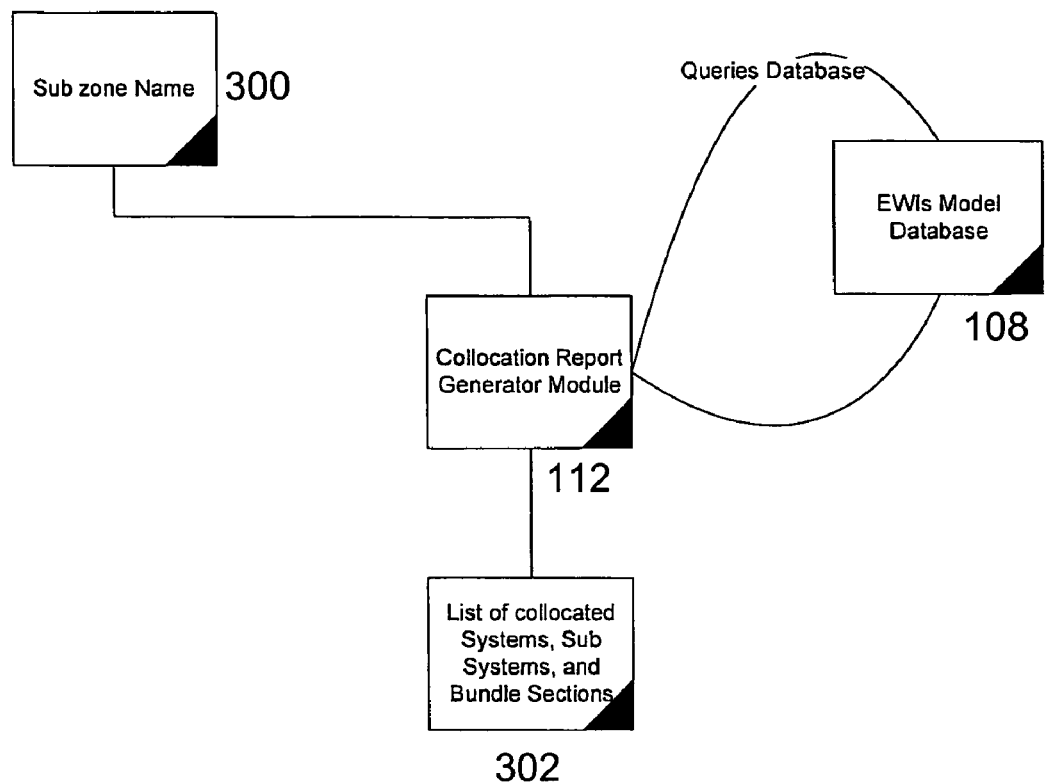
FIG. 23 shows an exemplary diagram of the inputs and outputs used in the generation of a collocation report for a sub-zone.

FIG. 23 illustrates the collocation report input and output for a sub-zone according to the present invention. In the sub-zone collocation reports, the input 300 may be the name of the sub-zone. Input 300 is sent to collocation report generator module 112. Collocation report generator module 112 queries EWIS model database 108 in order to generate the output 302. Output 302 includes, for example, a list of all collocated systems, sub-systems, and bundle sections that are physically adjacent to input 300 throughout the entire aircraft.

Figure 24:
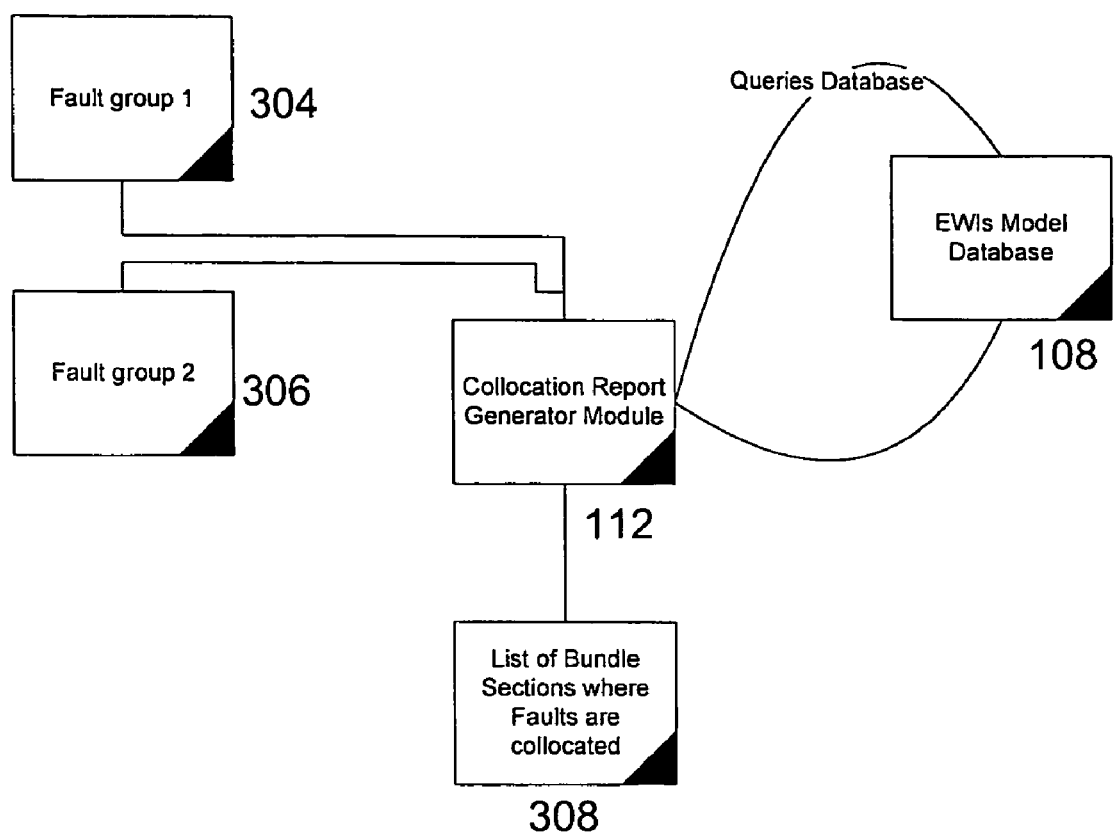
FIG. 24 shows an exemplary diagram of the inputs and outputs used in the generation of a collocation report for a fault.

FIG. 24 illustrates a fault collocation report according to the present invention. In the fault collocation report the inputs may be first fault group 304 and second fault group 306. Fault groups 304 and 306 are then sent to collocation report generator module 112. Collocation report generator module 112 queries EWIS model database 108 in order to generate the output 308. Output 308 includes, for example, a list of all bundle sections where any element (e.g. a single fault) of first fault group 304 is collocated with an element (e.g. another single fault) of second fault group 306.

Figure 25:
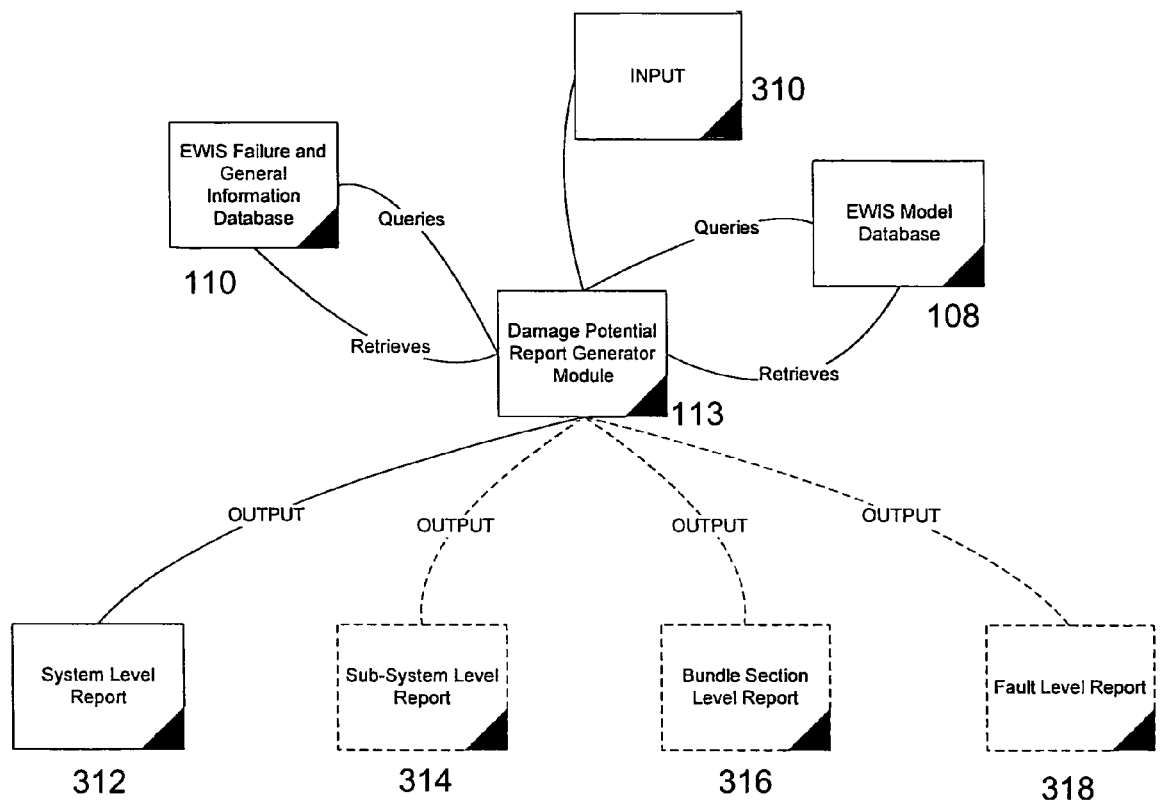
FIG. 25 shows an exemplary diagram of a damage potential report.

FIG. 25 illustrates a damage potential report according to the present invention. Here, the input 310 can be the name of the system, sub-system, bundle section, or fault for which a report is desired. The input data acquired via the RAT user interface 101 is sent to the damage potential report generator module 113. Damage potential report generator module 113 of the RAT application software 103 queries EWIS model database 108 and EWIS failure and general information database 110 in order to generate the output of damage potential reports via the RAT report mechanism 104. These reports include, for example, a system level report 312, a sub-system level report 314, a bundle section level report 316 and/or a fault level report 318. The system level report 312 provides a damage potential analysis on a single system. It includes the damage potential information on all bundles in which the selected system is contained. The sub-system level report 314 provides a damage potential analysis on a single sub-system. It includes damage potential information on all bundles where the selected sub-system is located. The bundle section damage potential report 316 provides a damage potential analysis on either a single selected bundle or on all bundles at once. The fault level report 318 provides a damage potential analysis on all bundles where at least one of the wires has the selected fault. This report includes the damage potential information on all bundles where the selected fault is found. All damage potential reports aid in the assessment of the risk associated with a bundle section (system, sub-system, or fault) due to the electrical arc track failure mode; with arc track potential ratings indicating the likelihood of an electrical arc track, and the damage potential ratings indicating the severity of the consequence of such an event.

Figure 26:
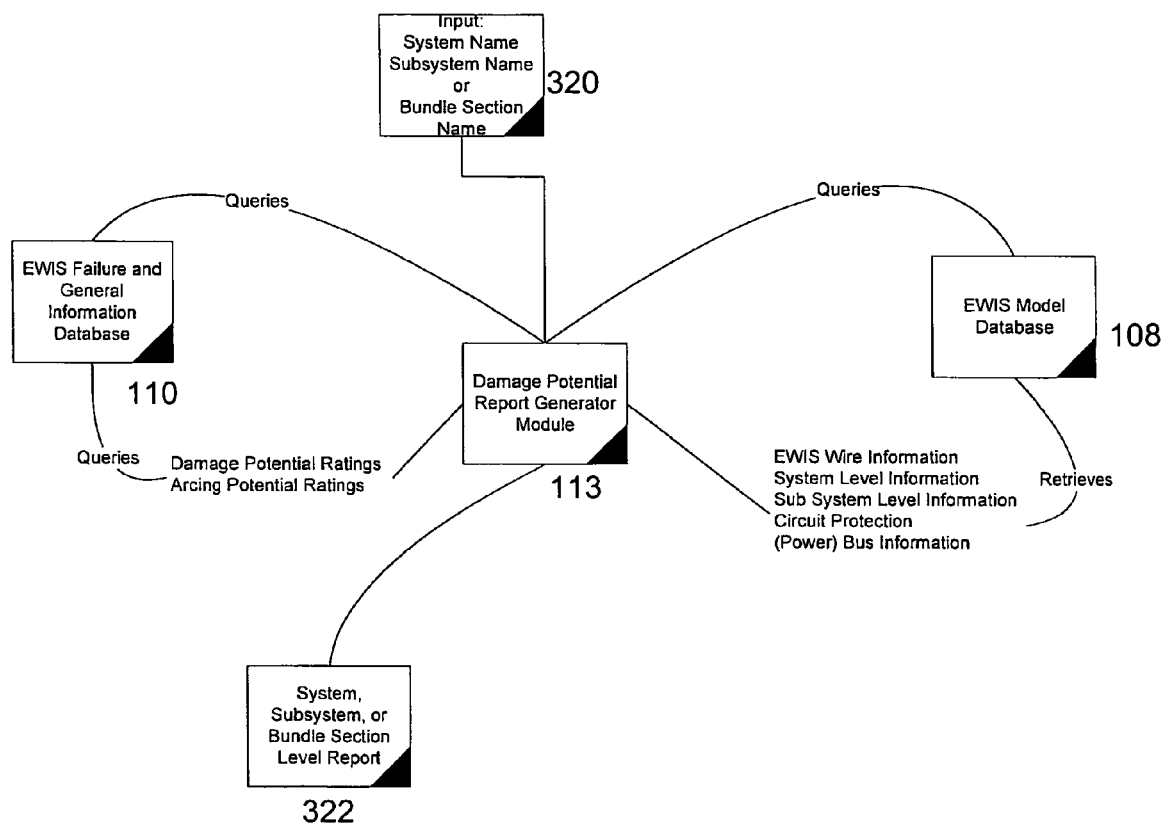
FIG. 26 shows an exemplary diagram for a damage potential report for a system, sub-system or bundle section.

FIG. 26 illustrates a damage potential report for either a system, sub-system or bundle section according to the present invention. The damage potential report can be similar for each of these levels. The damage potential report generator module 113 queries the EWIS model database 108 for all of the systems, sub-systems, bundles voltages, wire gauges, circuit protections, power bus information and insulation materials associated with the input system, sub-system or bundle section. After this information is retrieved the damage potential report generator module 113 queries the EWIS failure and general information database 110 for damage potential rating and arc track potential ratings that are associated with the wires that make up the input system, sub-system or bundle section. The system, sub-system or bundle section level report 322 may be a single damage potential rating and arc track potential rating for a bundle section contained in the subject system, sub-system or bundle, based on each bundle section's electrical characteristics and constituent wires. Included in the report are the electrical characteristics of all of the bundle sections and wires that are associated with the subject system, subsystem or bundle. In addition to damage potential and arc track potential, this may include superior system, superior sub-system, bundle section name, voltage information, wire gauges, circuit protection type, circuit protection rating, and/or insulation type.

Figure 27:
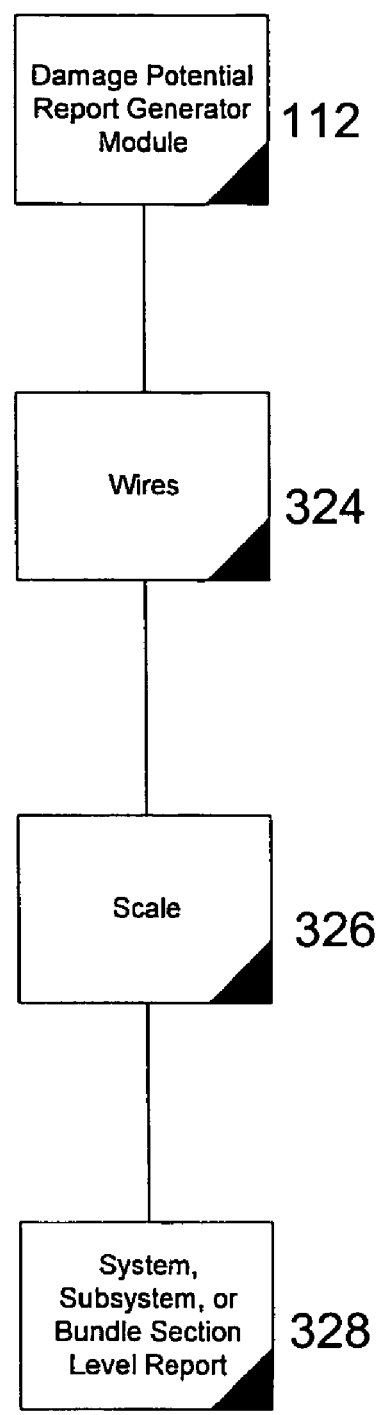
FIG. 27 shows an exemplary diagram of an algorithm used in the generation of a damage potential report.

FIG. 27 illustrates a damage potential report algorithm according to the present invention implemented by the RAT application software 103. The essence of the damage potential report algorithm is that it correlates the electrical characteristics of a wire to an amount or level of physical damage to the bundle section, adjacent structure, and other electrical and non electrical devices and objects in the event of an electrical arc track. The specific algorithm that is described herein is one exemplary way to correlate electrical characteristics with damage to adjacent structures. However, as would be recognized by those of ordinary skill in the art, other algorithms could be used and would remain within the scope of the present invention. A damage potential rating is given for every bundle section within the scope of the inquiry. The damage potential report generator module 112 queries the EWIS model database 108 and the EWIS failure and general information database 110 and returns one or more matrices including wire-level damage potential ratings for every wire that was retrieved in the query of EWIS model database 108. The wires are grouped by bundle section and each bundle section has its own matrix. Each of the wires in a bundle section is assigned a damage potential rating and a corresponding range of incinerated material at step 324 of FIG. 27. The mid-point of the range of incinerated material is taken for each wire and then the sum of the mid-points for each wire in the matrix is tabulated at step 326. An example of this is shown in Table 6 below:

TABLE 6

| Wire # | Damage Potential Rating | Corresponding range of incinerated material | Mid-point of range |
|---|---|---|---|
| wire A | 2 | 1-10 mm^3 | 5 |
| wire B | 2 | 1-10 mm^3 | 5 |
| wire N | 5 | 1000-2000 mm^3 | 1500 |
|  |  | Sum of Midpoints = | 1510 |

The sum of the mid-points from step 326 is matched with the corresponding damage potential rating at step 328, as illustrated in Table 7 below, to get the damage potential rating for the bundle section.

TABLE 7

| Amount of Incinerated Material | Damage Potential Ratings |
|---|---|
| 0-1 mm^3 | 1 |
| 1-10 mm^3 | 2 |
| 10-100 mm^3 | 3 |
| 100-1000 mm^3 | 4 |
| 1000-2000 mm^3 | 5 |
| 2000-5000 mm^3 | 6 |
| 5000-10000 mm^3 | 7 |

In the example shown in Table 6 above, the sum of the mid-points is calculated to be 1510. When compared to the damage potential scale in Table 7, a mid-point sum 1510 falls in the 1000-2000 mm^3 amount of incinerated material range. Thus, a damage potential rating of 5 is assigned to that bundle. The damage potential rating for the bundle is then output in the system, sub-system or bundle section level report at step 328. Thus, for every bundle section in the system, sub-system or bundle, reports may be generated for the damage potential and arc track potential, and may also include data on the superior system, superior sub-system, bundle section name, voltage information, wire gauges, circuit protection type, circuit protection rating and insulation type.

Figure 28:
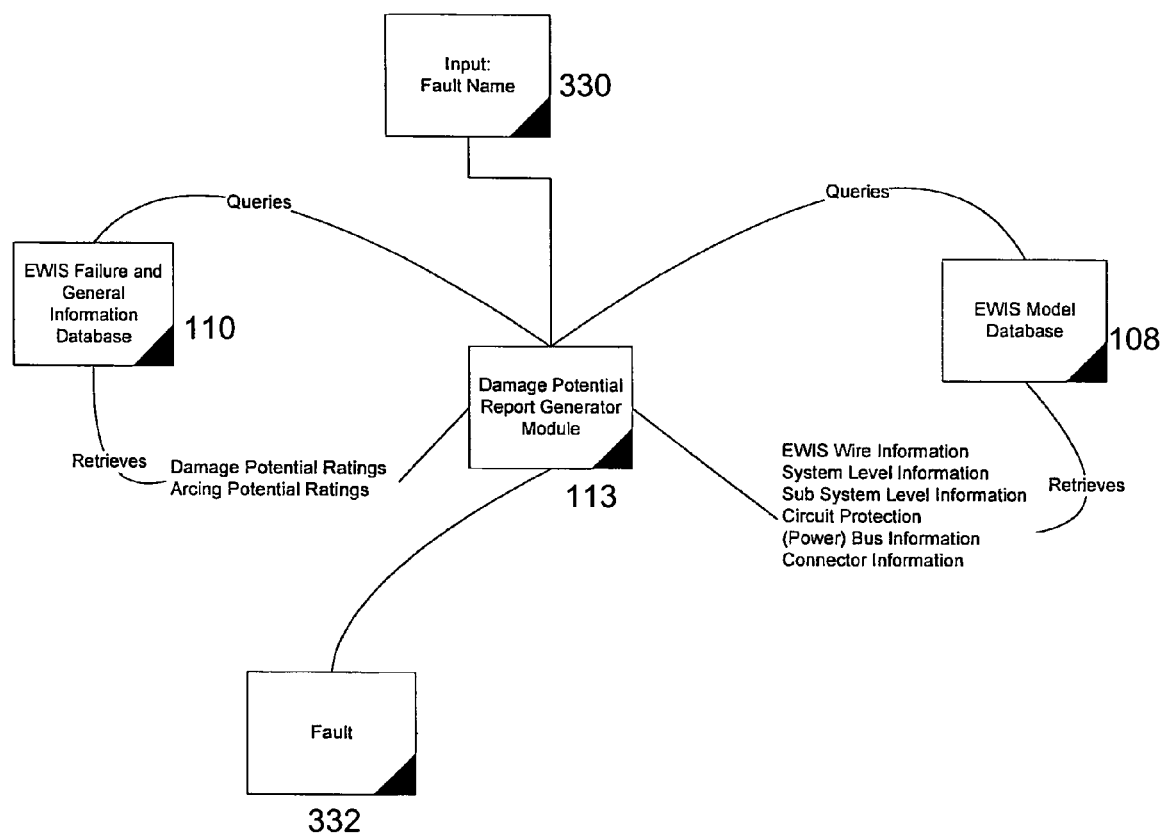
FIG. 28 shows an exemplary diagram of a damage potential report for a fault.

FIG. 28 illustrates a damage potential report for a fault according to the present invention. The damage potential report generator module 113 accepts as input 330 a fault name. Damage potential report generator module 113 then queries the EWIS model database 108 for bundle sections that contain the subject fault and retrieves of the associated systems, sub-systems, bundle sections that contain the subject fault and voltages, wire gauges, circuit protections and insulation materials associated with those systems, sub-systems and bundle sections. Damage potential report generator module 113 then queries the EWIS failure and general information database 110 for the damage potential ratings and arc track potential ratings that are associated with the electrical wires that make up the systems, sub-systems or bundle sections that are associated with the subject fault and were retrieved from EWIS model database 108. The generated fault 332 output includes, for example, a single damage potential rating and arc track potential rating for each bundle section that contains the subject fault. System names, subsystem names and bundle section names may also be included in the report, as well as the electrical characteristics of the bundle sections and wires that are associated with the subject system, sub-system and bundle sections.

Figure 29:
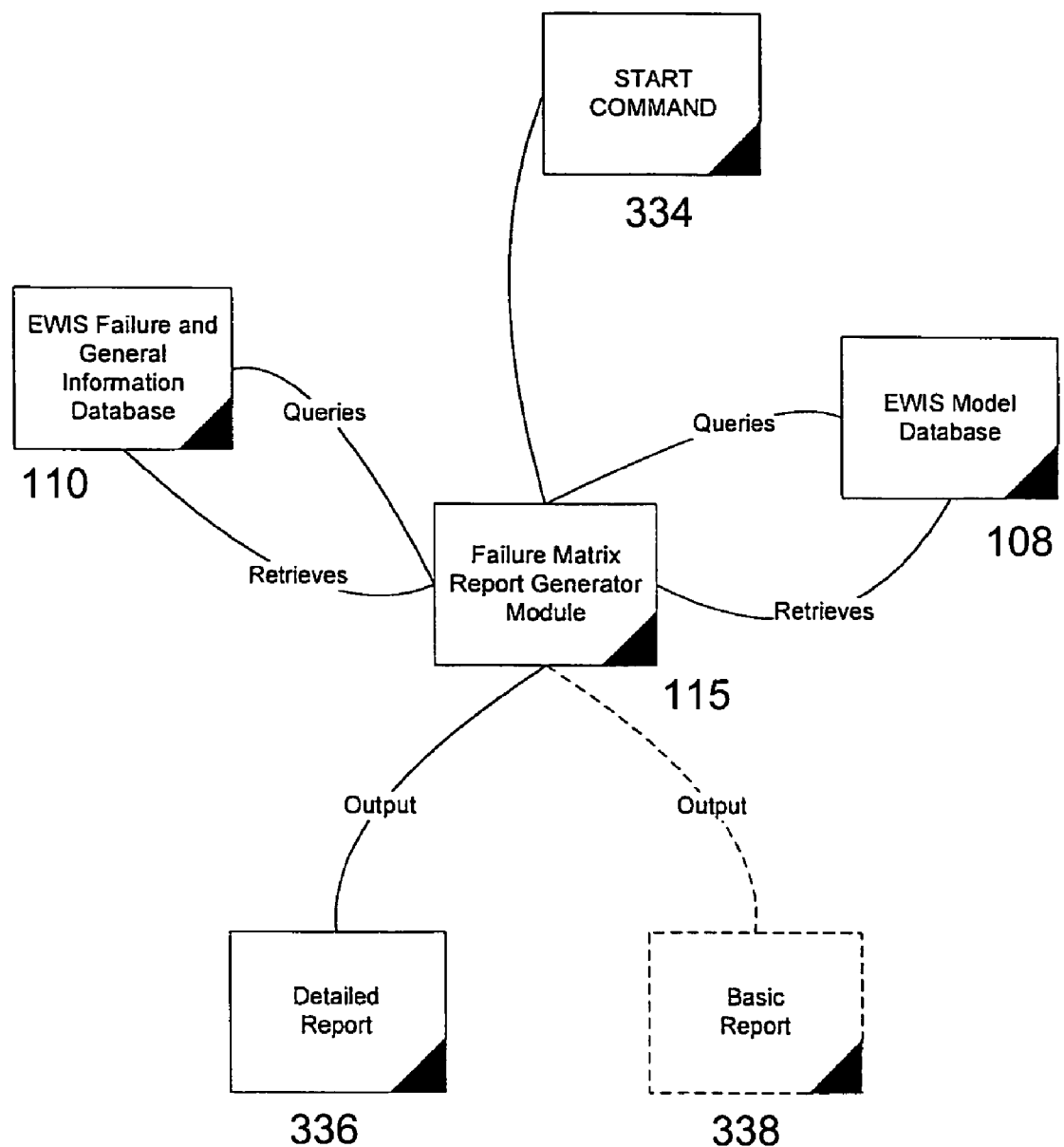
FIG. 29 shows an exemplary diagram of the generation of a failure matrix report.

FIG. 29 illustrates a failure matrix report according to the present invention. For a failure matrix report, the EWIS model database 108 and the EWIS failure and general information database 110 are queried by the failure matrix report generator module 115 of the RAT application software 103. The failure matrix report generator module 115 may then generate either a detailed failure matrix report 336 or a basic failure matrix report 338 via the RAT report mechanism 104.

A basic failure matrix report 338 includes a calculation of the probability of a given fault. Displayed in a hierarchical form, each failure effect may be categorized first by the upper level effect that it causes and then by the basic event that ties it into a fault tree. Probabilities are then associated with both the local/basic events and the EWIS/functional events and displayed in the output report. A detailed failure matrix report 336 can be the same as basic report 338, except that it can further break down the EWIS/functional faults into the individual wire failures that cause that event.

Figure 30:
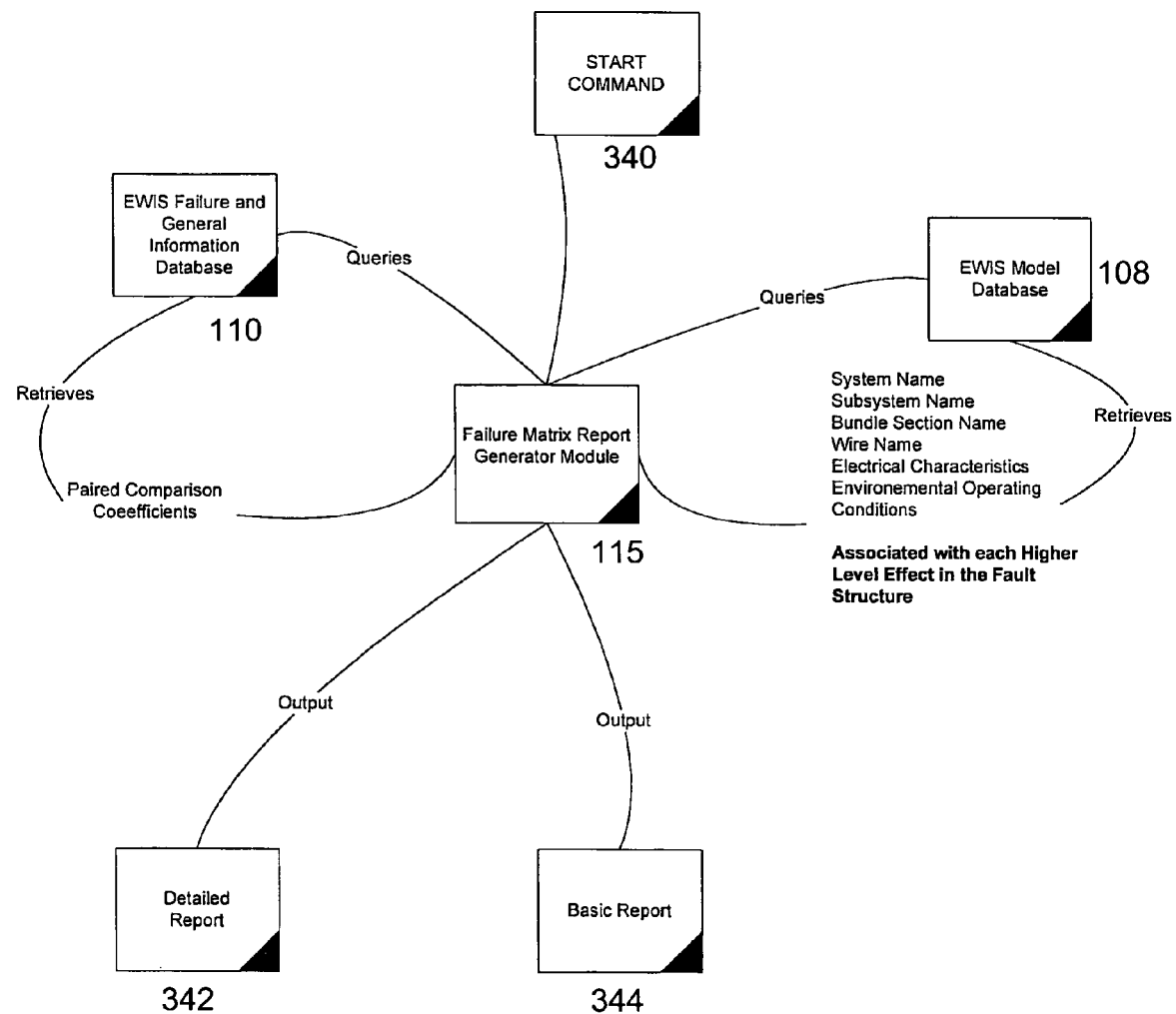
FIG. 30 shows an exemplary diagram of the inputs and outputs used in the generation of basic and detailed failure matrix reports.

FIG. 30 illustrates the inputs and outputs of both detailed and basic failure matrix reports according to the present invention as acquired by the RAT user interface 101. In one embodiment a start command 340 is sent to the failure matrix report generator module 115. The failure matrix report generator module 115 queries both the EWIS model database 108 and the EWIS failure and general information database 110. The system name, sub-system name, bundle section name, wire name, electrical characteristics and environmental operating conditions associated with each higher level effect in the fault structure are obtained from EWIS model database 108. Paired comparison coefficients are obtained from the EWIS failure and general information database 110. The failure matrix report generator module 115 generates a failure probability for each wire contained in a system, sub-system or bundle section that is associated with the higher level effect. In one embodiment of the present invention, wire failure probabilities are calculated based on their electrical characteristics and environmental operating conditions using a paired comparison technique. As would be understood by those of ordinary skill in the art, techniques other than a paired comparison technique could be used to fill in incomplete and/or unreliable historical data while remaining within the scope of the invention. Utilizing this technique, each wire failure is assumed to be statistically independent. Wire failure probabilities are unioned to calculate local level fault probabilities. The local level fault probabilities are then summed to calculate higher level effect probabilities. This process is then repeated to calculate the failure probability for each higher level effect, which is presented in detailed output report 342.

In another embodiment of the invention, the failure matrix report generator module 115 includes N failure equations, where N is a particular failure mode. The probability of a wire failure within a given failure mode is calculated using the following equation:

$$W_{1,1}X_1 + W_{2,1}X_2 + \ldots + W_{1,n}X_n$$

In the above equation, the "W's" represent the environmental, operational, or physical correlation failure coefficients and the "X's" describe the harshness of that environmental factor or physical wire attribute. Again, the paired comparison method is one way to calculate these coefficients, but other techniques may be used as well. The output of this equation represents the failure probability for a given wire failing in a particular way (i.e. the fail mode).

Thus, for each higher level, the detailed report 342 provides the probability of a higher level effect, the probability of associated local level faults, and the probability of associated EWIS functional faults. Basic reports 344 are generated similarly to detailed reports 342, but include only the local and higher level effect probabilities.

Figure 31:
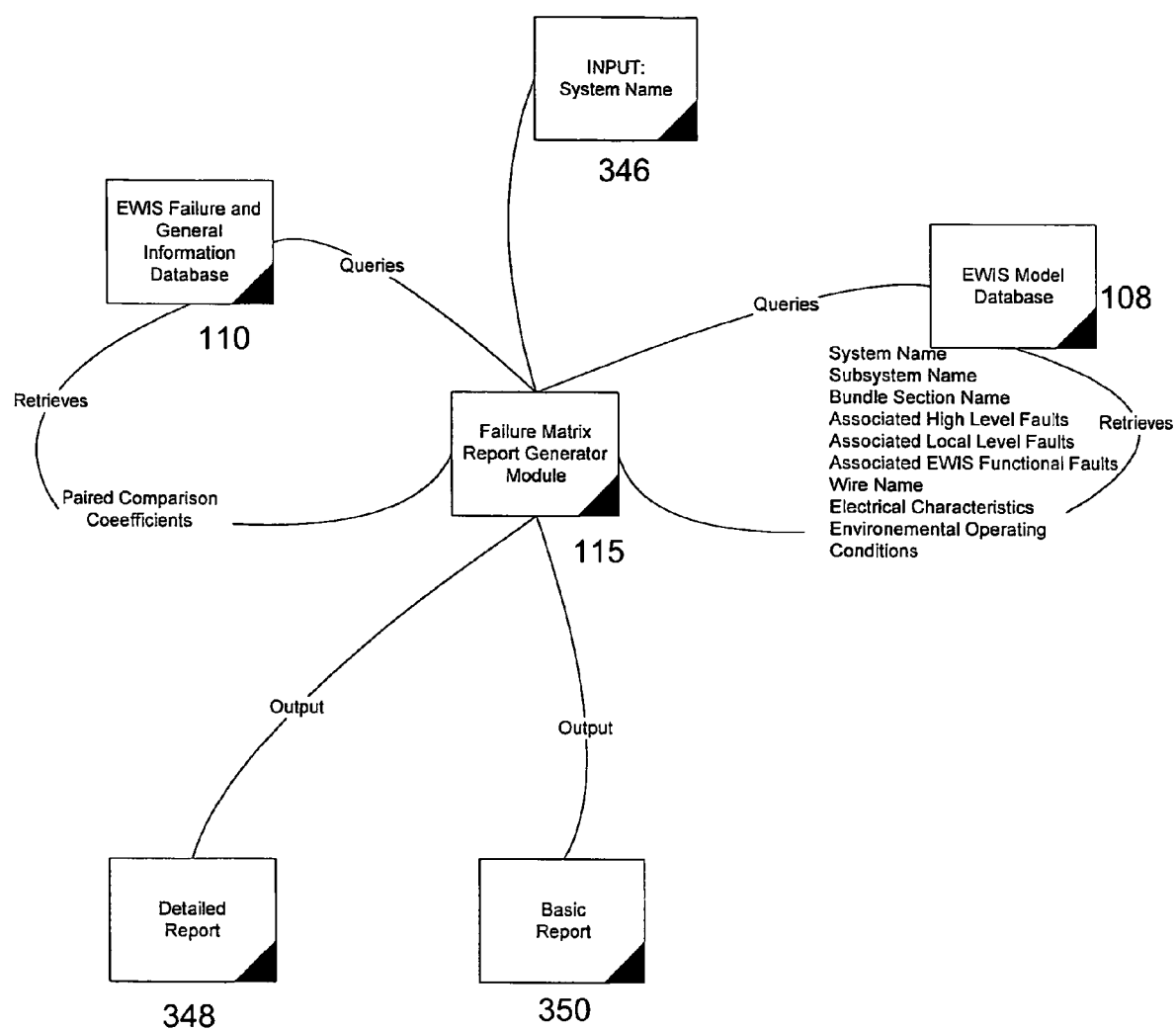
FIG. 31 shows an exemplary diagram of the generation of a FMEA report.

FIG. 31 illustrates a failure mode and effect analysis (FMEA) report according to the present invention. The EWIS model database 108 and the EWIS failure and general information database 110 are again queried by failure matrix report generator module 115 based on receiving a system name as input 346. The failure matrix report generator module 115 retrieves the system name, sub-system name, bundle section name, associated high level faults, associated local level faults, associated EWIS functional faults, the wire name, electrical characteristics and environmental operating conditions that are associated with each higher level effect in the fault structure from EWIS model database 108. The failure matrix report generator module 115 retrieves the paired comparison coefficients from the EWIS failure and general information database 110. The failure matrix report generator module 115 generates a failure probability for each wire contained in a system, sub-system or bundle section that is associated with the higher level effect. In one embodiment of the present invention, wire failure probabilities are calculated based on their electrical characteristics and operating conditions using a paired comparison technique, such as that described herein above. As would be understood by those of ordinary skill in the art, techniques other than a paired comparison technique could be used to fill in incomplete and/or unreliable historical data while remaining within the scope of the invention. For each higher level, the detailed report 348 shows the probability of a higher level effect, the probability of associated local level faults, and the probability of associated EWIS functional faults. Basic reports 350 are generated similarly to detailed reports 348, but include only the local and higher level effect probabilities.

Figure 32:
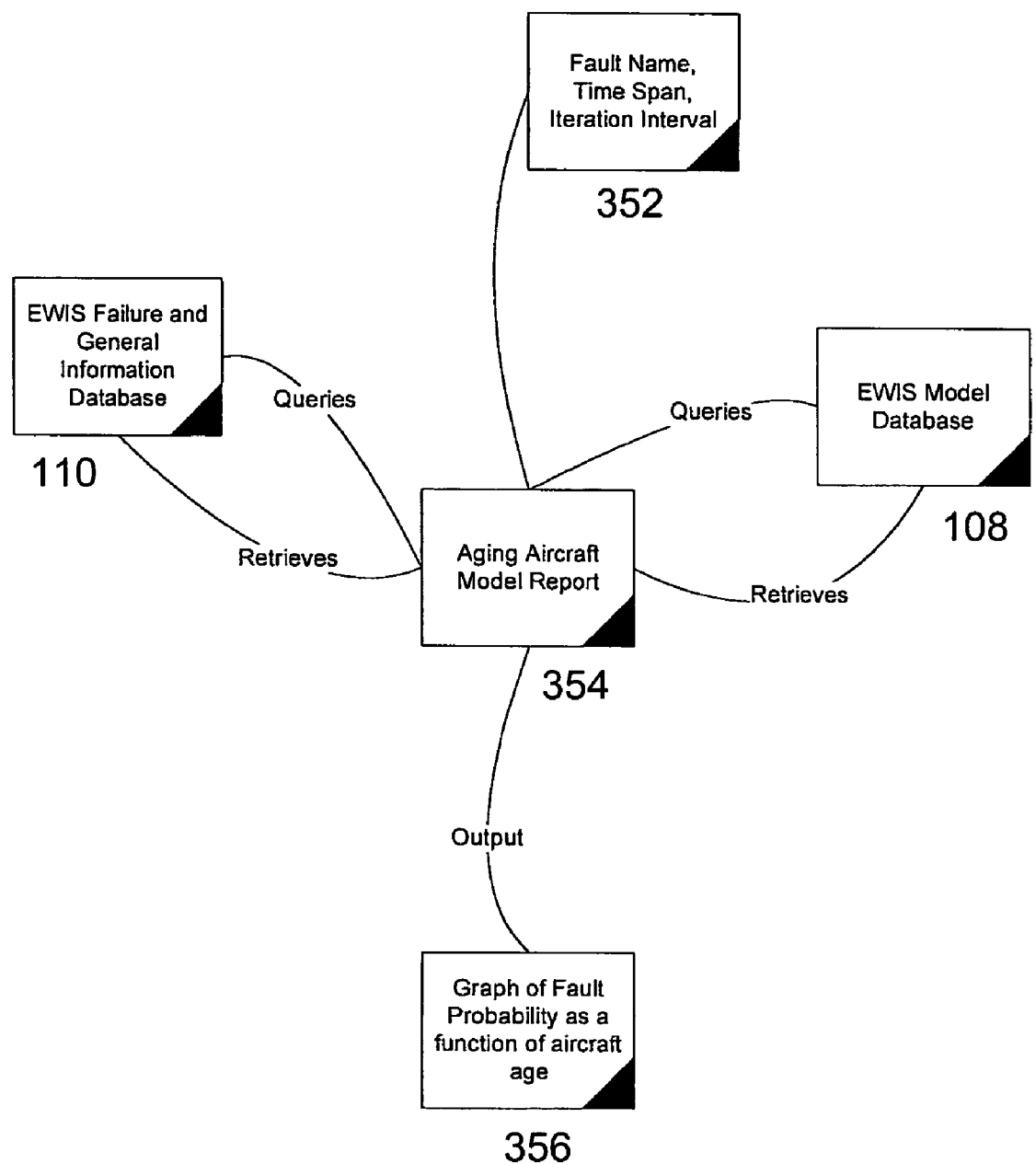
FIG. 32 shows an exemplary diagram of the generation of an aging model report.

FIG. 32 illustrates an aging model report showing the change in failure potential for a fault, system, or sub-system over a given time according to the present invention. In this diagram, fault name, time span, and iteration interval 352 are sent to aging aircraft model report module 354 as input data via the RAT user interface 101. Other input data may include the starting age of the aircraft, the maximum age of the aircraft, the number of years between calculations of the aging, the average relative humidity of the environment where the aircraft is stored, the average temperature of the environment where the aircraft is stored, and which faults are desired to be calculated. The aging aircraft model report module 354 of the RAT application software 103 queries both the EWIS model database 108 and the EWIS failure and general information database 110 and retrieves data regarding EWIS functional, local event, or higher level effect. The aging aircraft model report module 354 retrieves paired comparison coefficients and aging constants from the EWIS failure and general information database 110. The aging aircraft model report module 354 retrieves the system name, sub-system name, bundle section name, wire name, electrical characteristics, and environmental operating conditions associated with each higher level effect in the fault structure from the EWIS model database 108.

The aging aircraft model report module 354 generates several iterative failure matrix reports via the RAT report mechanism 104. For example, when t (time) equals 0, a standard failure matrix report is generated. When t equals 5, an age adjusted failure matrix report using aging constants stored in the EWIS failure and general information database 110 is generated. When t equals 10, another age adjusted failure matrix report using aging constants stored in the EWIS failure and general information database 110 is generated. The aging constants are obtained from the EWIS failure and general information database 110 and the failure effect probabilities are adjusted based on the exposure time in the operating environment.

Figure 33:
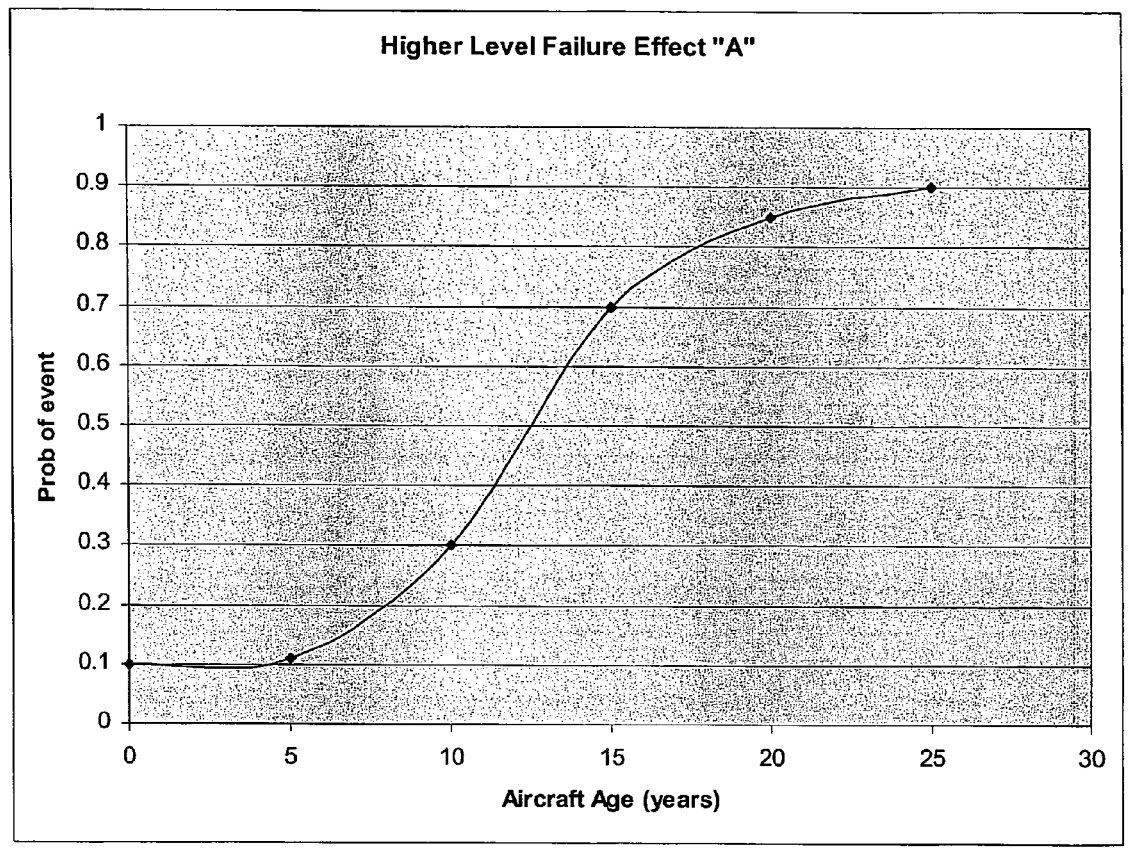
FIG. 33 shows an exemplary graph of an aging model report.

The reports output 356 from the aging aircraft model report module 354 can be in a graph format that illustrates an estimate of the relationship between the fault probability and the aircraft age. FIG. 33 illustrates an exemplary graph that is output 356. As shown in FIG. 33, a graph of the probability of an event against the age of the aircraft in years is presented in order to illustrate the change in the probability of the higher level failure effect over time.

Figure 34:
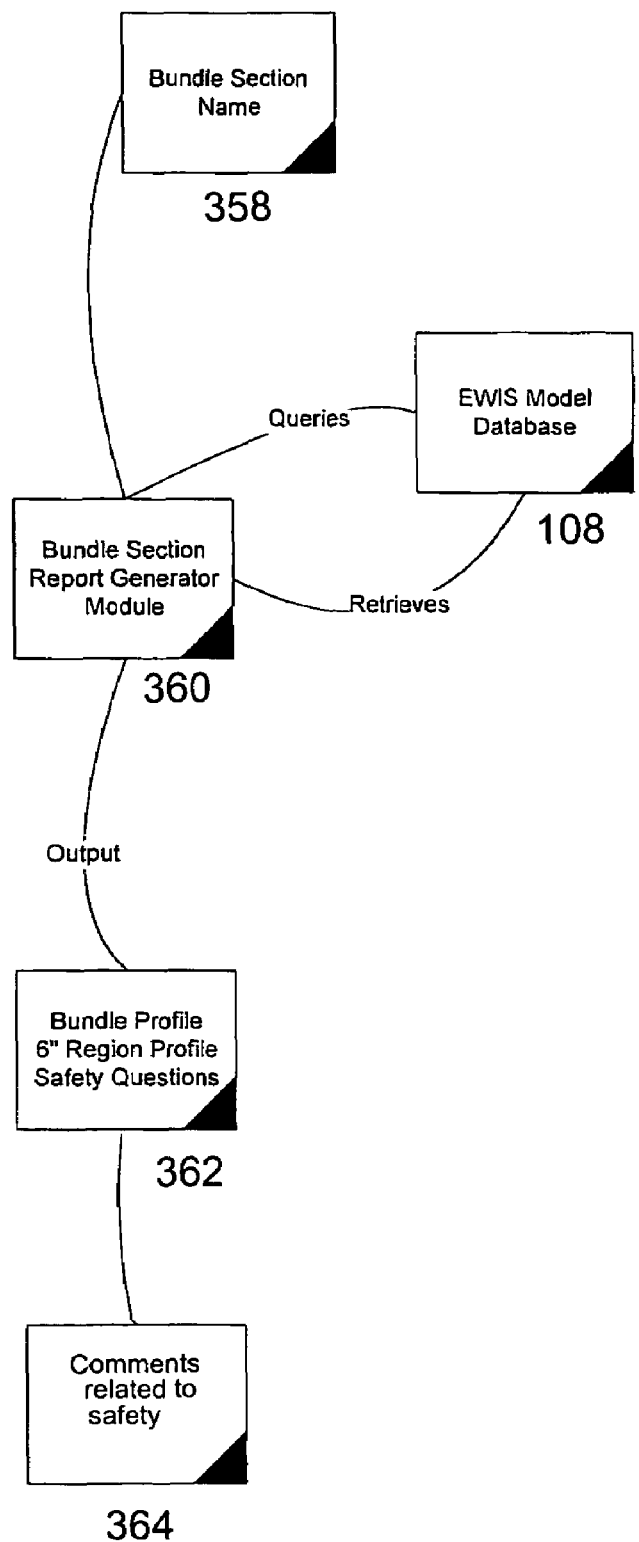
FIG. 34 shows an exemplary diagram of the generation of a bundle section report.

FIG. 34 illustrates a bundle section report that gives a full description of all of the bundle sections that have been entered into the EWIS RAT according to the present invention. This report examines the contents and routing of each bundle section, and cross-references those configurations with a list of design safety principles. Along with the bundle profile, the output may include a list of the design safety principles that have been violated to facilitate a safety analysis. According to one embodiment of the present invention, the EWIS RAT allows the user, via the RAT user interface 101, to annotate the results as to whether the listed design safety principles have been reviewed and/or whether the potential issue has been resolved. This information 364 can be included in the bundle section report provided by the RAT report mechanism 104.

Bundle section name 358 is input via the RAT user interface 101 to the bundle section report generator module 360 of the RAT application software 103. The bundle section report generator module 360 queries the EWIS model database 108 and the EWIS failure and general information database 110. The bundle section report generator module 360 obtains the bundle name associated wires, connectors and electrical characteristics, as well as a six inch region profile from the EWIS model database 108. The bundle section report generator module 360 obtains damage potential ratings and arc track potential ratings from the EWIS failure and general information database 110.

The bundle section report generator module 360, in one embodiment, includes a dynamic link library (DLL) that runs a series of queries on the bundle configuration. Each query checks the bundle configuration against the requirements of a safety design principle that is programmed into the DLL. Each safety design principle deals with dangerous configurations of wires and their proximity to other critical devices and systems on the aircraft, such as those within a six inch region. In addition, any aspect of the bundle section configuration that does not meet the requirements of a safety principle are returned in the output report along with the description of the principle which has been violated.

The reports output 362 from the bundle section report generator module 360 may be a bundle profile, a six inch region profile and/or safety questions. A bundle profile includes all spatial and functional attributes of the systems, sub-systems, etc. A six inch region profile includes all bundles, systems, sub-systems and electrical and non-electrical devices within six inches of the bundle section. The safety questions include a list of safety design principles that may have been violated as well as details on how and why those principles were violated. Also included via the RAT user interface 101 is an editing capability that allows a user to add comments describing mitigation techniques, system and aircraft functional information, or other data to the report to verify the safety of the bundle section.

Figure 35:
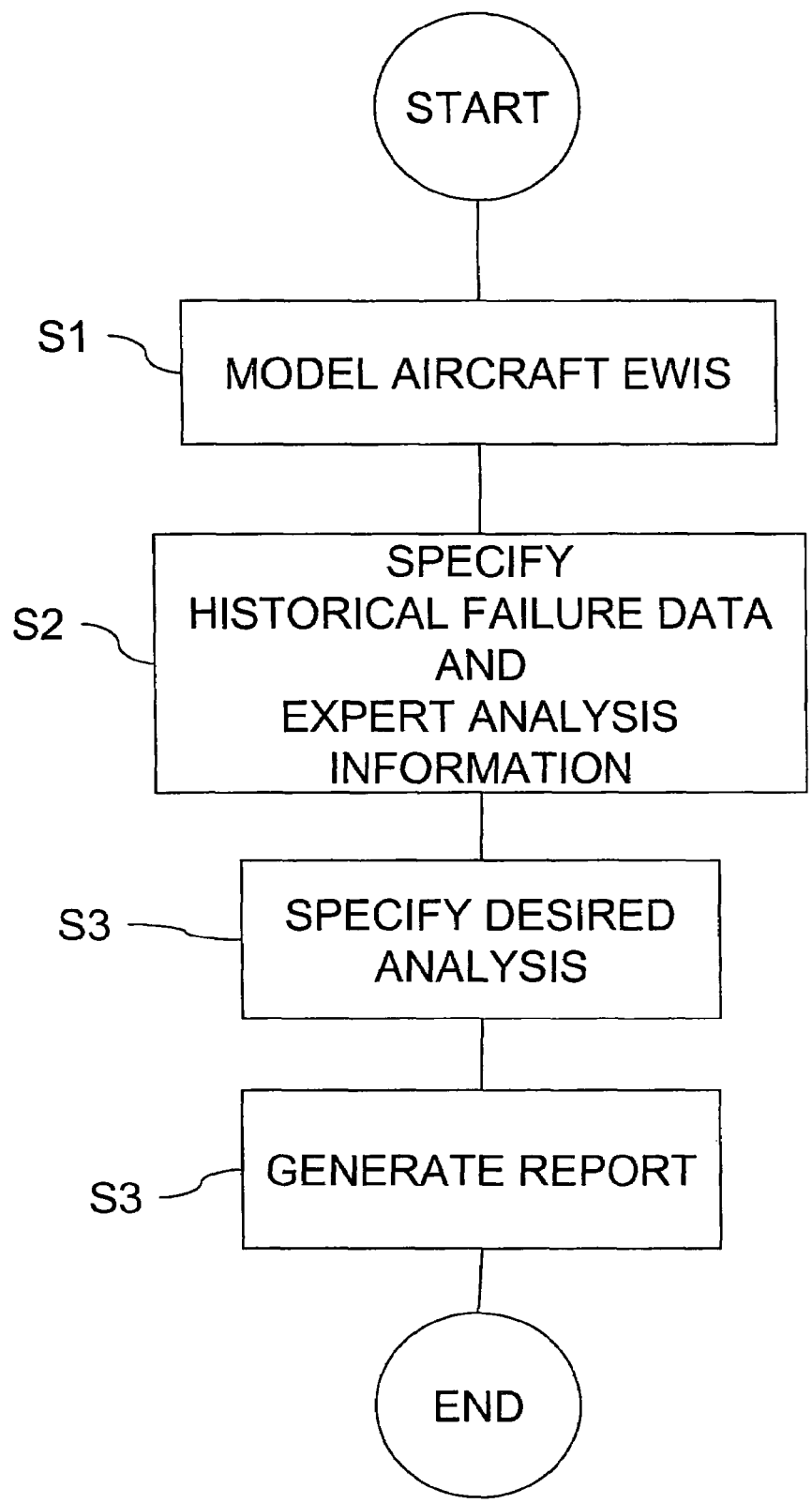
FIG. 35 illustrates an exemplary process for carrying out an aircraft EWIS risk assessment according to one embodiment of the present invention.

FIG. 35 illustrates a process through which a risk assessment of an aircraft EWIS may be performed according to one embodiment of the present invention. As shown in FIG. 35, the process begins with step S1 where the aircraft EWIS is modeled by populating information into the EWIS model database 108. As described hereinabove, the RAT user interface 101, the RAT database management mechanism 102, and the RAT application software 103 are used to populate the EWIS model database 108. The process then proceeds to step S2 where historical failure data and expert analysis information are specified. As described hereinabove, the RAT user interface 101, the RAT database management mechanism 102, and the RAT application software 103 are used to populate information into the EWIS failure and general information database 110. The process then proceeds to step S3 where the type of analysis desired by the user is specified. As described hereinabove, the RAT user interface 101 is used to obtain input information from the user, then the RAT application software 103 and the RAT database management mechanism 102 are used to query the EWIS model database 108 and/or the EWIS failure and general information database 110 to obtain information and perform the analysis requested by the user. The process then proceeds to step S3 where a report is generated. As described hereinabove, the RAT application software 103 and the RAT report mechanism 104 are used to generate a report presenting the requested analysis to the user.

Obviously, numerous modifications and variations of the present invention are possible in light of the above teachings. It is therefore to be understood that within the scope of the appended claims, the invention may be practiced otherwise than as specifically described herein.

What is claimed is:

1. A diagnostic terminal for generating a failure risk assessment relative to an electrical wiring interconnect system (EWIS) of an aircraft, comprising:
   a data processor configured to generate the failure risk assessment identifying an affect on at least one operational component of the EWIS based upon a failure in a different component of the EWIS;
   a database interface responsive to the data processor to query records of an EWIS model database and a failure database operably linked thereto, the model database storing at least one predetermined EWIS model, the EWIS model defining a hierarchy of definitions each corresponding to a respective component of the EWIS, the definitions identifying at least an electrical characteristic, the failure database storing indicia relative to the component definitions, including failure tolerances; and
   a graphical user interface, responsive to the data processor to receive an identification of the failure and to select a level of the hierarchy, or components thereof, for initiating the failure risk assessment relative thereto.

2. The diagnostic terminal according to claim 1, wherein the definitions include a spatial orientation of a component relative to others of the EWIS.

3. The diagnostic terminal according to claim 2, wherein the spatial orientation identifies a predetermined physical area in the vicinity of the component which is a level of the hierarchy, and components within the vicinity of the spatial orientation are grouped therein.

4. The diagnostic terminal according to claim 1, wherein the spatial orientation identifies a level of vibration.

5. The diagnostic terminal according to claim 1, wherein the component is a wire and is defined in the hierarchy based upon a corresponding wire bundle.

6. The diagnostic terminal according to claim 5, wherein the component definition of the wire includes at least one physical parameter thereof.

7. The diagnostic terminal according to claim 6, wherein the component definition of the wire includes at least one operating parameter thereof.

8. The diagnostic terminal according to claim 1, wherein the failure database further comprises weighted coefficients corresponding to the failure tolerances.

9. The diagnostic terminal according to claim 1, wherein the failure involves at least one component of a first hierarchical level and the graphical user interface presents the failure risk assessment as a hierarchical fault tree of the EWIS, including at least a second hierarchical level describing potential affects of a failure of the at least one component with respect thereto.

10. The diagnostic terminal according to claim 9, wherein the hierarchical fault tree includes all levels of the hierarchy, originating with the level of the failure and describes probabilities of failures at every level thererelated.

11. The diagnostic terminal according to claim 9, wherein the failure is an electrical arcing causing physical damage within the first hierarchical level, the risk assessment correlating the physical damage with potential electrical failures within the first hierarchical level.

12. The diagnostic terminal according to claim 9, wherein the hierarchical fault tree describes risk of failure based on an age of the components of the hierarchy.

13. A computer readable storage medium encoded with computer program instructions which cause a computer to execute a method of determining a failure risk relative to an electrical wiring interconnect system (EWIS) of an aircraft, comprising:
  providing at least one level of a defined hierarchical model corresponding to the EWIS, for initiating the risk assessment with respect thereto;
  querying records of an EWIS model database and a failure database in correspondence to the selecting, the model database storing at least one predetermined EWIS hierarchical model, the EWIS model defining a hierarchy of definitions each corresponding to a respective component of the EWIS, the definitions identifying at least an electrical characteristic and a spatial layout of a component relative to others of the EWIS, the failure database storing indicia relative to the component definitions, including failure tolerances;
  assessing the failure risk relative to at least one operating component of the EWIS based upon a failure in a different component of the EWIS; and
  presenting, graphically, at least one hierarchical level removed from a level including the failure and describing the failure risk with respect thereto.

14. The computer readable storage medium to claim 13, wherein the failure involves at least one component of a first hierarchical level and the presenting includes graphically describing the failure as a hierarchical fault tree of the EWIS, the hierarchical fault tree includes all levels of the hierarchy, originating with the level of the failure and describes probabilities of propagating failures at every level thererelated.

15. The diagnostic terminal according to claim 14, wherein the failure is an electrical arcing causing physical damage within the first hierarchical level, the failure risk correlating the physical damage with potential electrical failures within the first hierarchical level.

16. The diagnostic terminal according to claim 15, wherein the spatial layout identifies a predetermined physical area in the vicinity the component.

17. The diagnostic terminal according to claim 15, wherein the spatial layout identifies a level of vibration.

18. The diagnostic terminal according to claim 17, wherein the component definition of the wire includes at least one physical parameter thereof.

19. The diagnostic terminal according to claim 15, wherein the component is a wire and is defined in the hierarchy based upon a corresponding wire bundle.

20. The diagnostic terminal according to claim 19, wherein the component definition of the wire includes at least one operating parameter thereof.

21. The diagnostic terminal according to claim 15, wherein the failure database further comprises weighted coefficients corresponding to the failure tolerances.

22. The diagnostic terminal according to claim 21, wherein the hierarchical fault tree includes all levels of the hierarchy, originating with the level of the failure condition and describes probabilities of failures at every level thererelated.

23. The diagnostic terminal according to claim 21, wherein the failure is an electrical arcing causing physical damage within the first hierarchical level, the risk assessment correlating the physical damage with potential electrical failures within the first hierarchical level.

24. The diagnostic terminal according to claim 21, wherein the hierarchical fault tree describes risk of failure based on an age of the components of the hierarchy.

25. The diagnostic terminal according to claim 15, wherein the failure condition involves at least one component of a first hierarchical level and the graphical user interface presents the failure risk assessment as a hierarchical fault tree of the EWIS, including at least a second hierarchical level describing potential affects of a failure of the at least one component with respect thereto.

26. A diagnostic terminal for generating a failure risk assessment relative to an electrical wiring interconnect system (EWIS) of an aircraft, comprising:
  processing means for generating the failure risk assessment identifying an affect on at least one operational component of the EWIS based upon a failure in a different component of the EWIS;
  querying means, responsive to the processing means for retrieving records of an EWIS model database and a failure database operably linked thereto, the model database storing at least one predetermined EWIS model, the EWIS model defining a hierarchy of definitions each corresponding to a respective component of the EWIS, the definitions identifying at least an electrical characteristic and a spatial layout of a component relative to others of the EWIS, the failure database storing indicia relative to the component definitions, including failure tolerances; and
  a graphical user interface, responsive to the data processor to receive an identification of the failure and to select a level of the hierarchy, or components thereof, for initiating the failure risk assessment relative thereto.

27. The diagnostic terminal according to claim 26, wherein the spatial layout is a level of the hierarchy and components within the spatial layout are grouped therein.

28. A system of determining a failure risk relative to an electrical wiring interconnect system (EWIS) of an aircraft, comprising:
  providing at least one level of a defined hierarchical model corresponding to the EWIS, for initiating the risk assessment with respect thereto;

querying, from a diagnostic terminal, records of an EWIS model database and a failure database in correspondence to the selecting, the model database storing at least one predetermined EWIS hierarchical model, the EWIS model defining a hierarchy of definitions each corresponding to a respective component of the EWIS, the definitions identifying at least an electrical characteristic and a spatial layout of a component relative to others of the EWIS, the failure database storing indicia relative to the component definitions, including failure tolerances;

assessing the failure risk relative to at least one operating component of the EWIS based upon a failure in a different component of the EWIS; and presenting, graphically at the diagnostic terminal, at least one hierarchical level removed from a level including the failure and describing the failure risk with respect thereto.

29. The system according to claim 28, wherein the failure involves at least one component of a first hierarchical level and the presenting includes graphically describing the failure as a hierarchical fault tree of the EWIS, the hierarchical fault tree includes all levels of the hierarchy, originating with the level of the failure and describes probabilities of propagating failures at every level thererelated.

30. The diagnostic terminal according to claim 29, wherein the failure is an electrical arcing causing physical damage within the first hierarchical level, the failure risk correlating the physical damage with potential electrical failures within the first hierarchical level.

* * * * *